(12) United States Patent
Howard et al.

(10) Patent No.: US 9,448,718 B2
(45) Date of Patent: Sep. 20, 2016

(54) METHOD, SYSTEM, AND COMPUTER-READABLE MEDIUM FOR PRESENTING USER INTERFACE FOR COMPARISON OF MARKETPLACE LISTINGS

(71) Applicant: eBay Inc., San Jose, CA (US)

(72) Inventors: Dane Howard, Los Gatos, CA (US); Jack Phillip Abraham, Palo Alto, CA (US); Shannon B. Vosseller, San Francisco, CA (US); Michael Lenahan, Moraga, CA (US); Ben Mitchell, Oakland, CA (US)

(73) Assignee: eBay Inc., San Jose, CA (US)

( * ) Notice: Subject to any disclaimer, the term of this patent is extended or adjusted under 35 U.S.C. 154(b) by 240 days.

(21) Appl. No.: 13/705,427

(22) Filed: Dec. 5, 2012

(65) Prior Publication Data

US 2013/0311335 A1 Nov. 21, 2013

Related U.S. Application Data

(60) Provisional application No. 61/649,158, filed on May 18, 2012.

(51) Int. Cl.
*G06F 3/0488* (2013.01)
*G06Q 30/06* (2012.01)
(Continued)

(52) U.S. Cl.
CPC .......... *G06F 3/04883* (2013.01); *G06F 3/017* (2013.01); *G06F 3/04817* (2013.01); *G06F 3/04847* (2013.01); *G06Q 30/0629* (2013.01); *G06F 3/0481* (2013.01); *G06F 17/3089* (2013.01)

(58) Field of Classification Search
CPC ....................................................... G06Q 30/06
USPC ................................................ 705/26.1–27.2
See application file for complete search history.

(56) References Cited

U.S. PATENT DOCUMENTS 7,479,949 B2 * 1/2009 Jobs ...................... G06F 3/0488
345/169
7,945,484 B1 * 5/2011 Tam et al. .................. 705/26.41
(Continued)

OTHER PUBLICATIONS

Apple_MouseOver (http://web.archive.org/web/20101113144530/http://developer.apple.com/library/safari/#/web/20101113062603/http://developer.apple.com/library/safari/documentation/AppleApplications/Reference/SafariWebContent/HandlingEvents/HandlingEvents.html), Nov. 13, 2010.*
(Continued)

*Primary Examiner* — Jeffrey A Smith
*Assistant Examiner* — Jennifer Lee
(74) *Attorney, Agent, or Firm* — Schwegman, Lundberg & Woessner, P.A.

(57) ABSTRACT

After marketplace listings are returned via a search, an indication of two or more of the marketplace results to pin and compare is received. A travel cost for any pinned local marketplace result to compare is calculated by determining a travel distance between the electronic device and the location in the pinned local marketplace result to compare and estimating a cost associated with traveling the travel distance. A true purchase price is calculated for each pinned local marketplace result to compare by adding the price for the product, the sales tax, and the travel cost. A true purchase price for each pinned online marketplace result to compare by adding the price for the product, the sales tax, and the shipping cost, these true purchase prices are then displayed side-by-side in the user interface.

14 Claims, 34 Drawing Sheets

(51) Int. Cl.
*G06F 3/01* (2006.01)
*G06F 3/0484* (2013.01)
*G06F 3/0481* (2013.01)
*G06F 17/30* (2006.01)

(56) References Cited

U.S. PATENT DOCUMENTS

| | | |
|---|---|---|
| 8,291,350 B1 | 10/2012 | Park et al. |
| 2007/0150369 A1* | 6/2007 | Zivin ............................... 705/26 |
| 2008/0168401 A1* | 7/2008 | Boule et al. .................. 715/863 |
| 2009/0299887 A1* | 12/2009 | Shiran et al. ................... 705/35 |
| 2010/0005069 A1* | 1/2010 | Wang ................................ 707/3 |
| 2010/0283743 A1* | 11/2010 | Coddington ................. 345/173 |
| 2012/0253908 A1 | 10/2012 | Ouimet et al. |
| 2012/0265644 A1* | 10/2012 | Roa .................... G06Q 30/0643 705/26.61 |
| 2013/0145319 A1 | 6/2013 | Wein et al. |
| 2013/0173431 A1* | 7/2013 | Nations .............. G06Q 30/0277 705/26.64 |
| 2013/0246219 A1* | 9/2013 | Mishanski et al. .......... 705/26.9 |
| 2013/0311909 A1 | 11/2013 | Howard et al. |

OTHER PUBLICATIONS

Amazon's collection of mobile shopping apps now includes the amazon app for windows phone 7. (Feb. 10, 2011). Business Wire Retrieved from http://search.proquest.com/docview/850826990?accountid=14753.*

"U.S. Appl. No. 13/705,474, Non Final Office Action mailed Aug. 29, 2014", 13 pgs.

Collier, "eBay® for Dummies®", 6th Edition, (Jun. 29, 2009), 1-6.

Miller, "Sams Teach Yourself eBay® in 10 Minutes", (Feb. 23, 2011), 1-12.

\* cited by examiner

METHOD, SYSTEM, AND COMPUTER-READABLE MEDIUM FOR PRESENTING USER INTERFACE FOR COMPARISON OF MARKETPLACE LISTINGS

TECHNICAL FIELD

The present disclosure generally relates to data processing techniques. More specifically, the present disclosure describes a technique for presenting two (or more) search results for product listings in a manner that facilitates a simple and meaningful comparison of the product listings.

BACKGROUND

The Internet and the World Wide Web have given rise to a wide variety of on-line retailers that operate virtual stores from which consumers can purchase products (i.e., merchandise or goods) as well as services. Although the popularity of these on-line retail sites is clearly evidenced by their increasing sales, for a variety of reasons, some consumers still would rather purchase products and services in a more conventional manner—i.e., via a brick-and-mortar store. Even when purchasing products and services from a brick-and-mortar store, various web-based applications and tools may be used to perform preliminary research about products and services.

DETAILED DESCRIPTION

The present disclosure describes data processing techniques presenting two or more marketplace listings, selected from a set of search results, such that comparison of the listings is simple and intuitive. In the following description, for purposes of explanation, numerous specific details are set forth in order to provide a thorough understanding of the various aspects of different embodiments of the present invention. It will be evident, however, to one skilled in the art, that the present embodiments may be practiced without all of the specific details.

Consistent with some embodiments of the invention, a network-based publication system processes a search query and returns a set of search results, e.g., in the form of a search results page or similar user interface, where each result is a marketplace listing for an item, good, product or service being offered for sale. Upon detecting selection of two or more listings and invocation of a comparison request, the two or more selected listings are presented in a comparison user interface (UI) such that the various attributes of each item/product/service are presented arranged vertically, and the individual search results are positioned next to one another horizontally. With some embodiments, the presentation of the comparison UI is on a mobile device with a touch-sensitive display having limited size. As such, the UI is presented in such a way that the user can navigate between the two listings by performing a simple gesture to flick or drag the listings to the left or right revealing the other listing. For instance, if a first listing is being presented, the user may simply "drag" or "push" (with a gesture) that listing to the left (or right) to reveal the second listing. Because the listings are presented with the attributes arranged horizontally, comparison on a feature-by-feature (or attribute-by-attribute) basis is easy.

With some embodiments, various costs for owning a product that are not readily apparent may be displayed. For example, with some embodiments, the cost of returning the product, the cost of maintaining the product, and/or the cost of disposing of the product may be displayed. Similarly, these costs may be aggregated for each individual listing and then presented as a total cost of ownership for the product.

With some embodiments, a user can select to view all attributes or features of two or more products that are the same. Accordingly, only those attributes that are the same will be presented. Similarly, the user may select to view only those attributes that are different between the two listings.

Other benefits of the embodiments of the present invention will be readily apparent from the description of the figures that follows.

EXAMPLE SYSTEM

Figure 1:
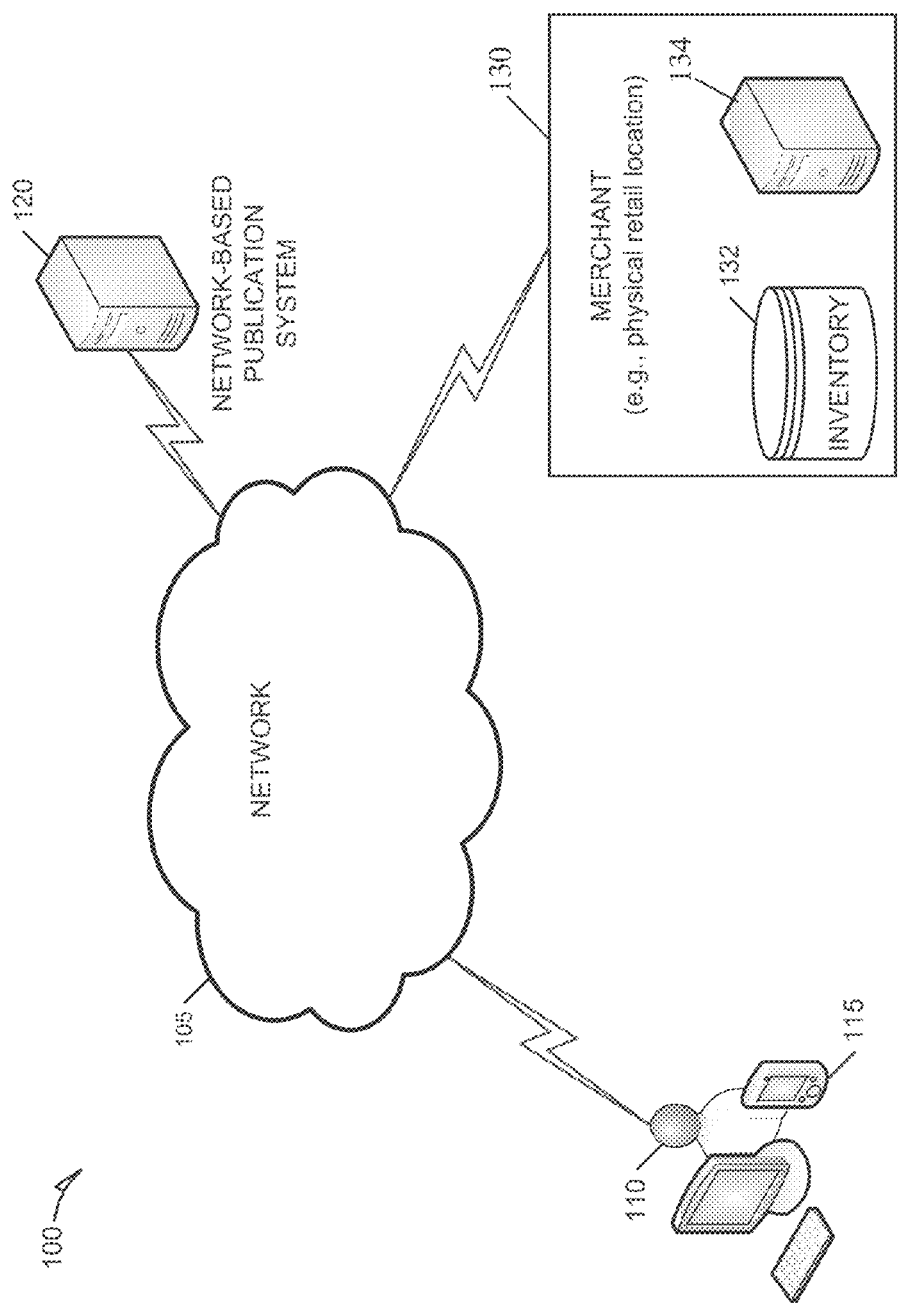
FIG. 1 is a block diagram depicting a system for delivering search results that can be easily compared with one another, according to an example embodiment.

FIG. 1 is a block diagram depicting a system 100 for delivering search results that can be easily compared with one another, according to an example embodiment. The system 100 can include a user 110, a network-based publication system 120 with a search engine, and one or more merchants 130 (and merchant systems). In an example, the user 110 can connect to the network-based publication system 120 via a client computing device 115 (e.g., desktop, laptop, smart phone, PDA, or similar electronic device capable of some form of data connectivity) and network 105. The network-based publication system 120 will receive and process a query from the user's client computing device 115, and return search results in a search results page or similar UI, typically with the most relevant results listed first (or, at the top).

In an example, the merchant 130 can operate computer systems, such as an inventory system 132 or a POS system 134. The network-based publication system 120 can interact with any of the systems used by merchant 130 for operation of the merchant's retail or service business. In an example, the network-based publication system 120 can work with both POS system 134 and inventory system 132 to obtain access to inventory available at individual retail locations run by the merchant. This inventory information can be used in both generating product or service listings, and selecting and ordering search results served by the network-based publication system 120.

EXAMPLE MOBILE DEVICE

Figure 2:
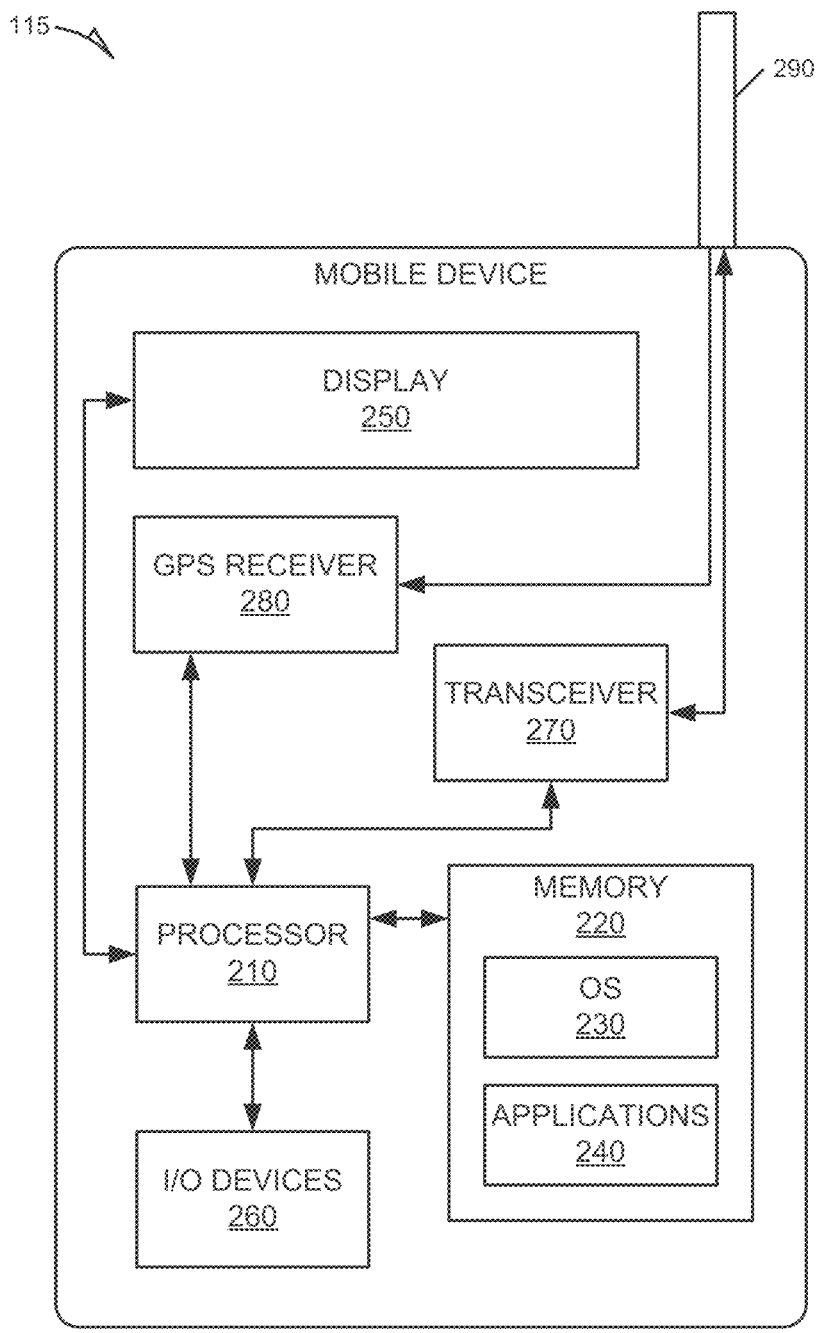
FIG. 2 is a block diagram illustrating the mobile device, according to an example embodiment.

FIG. 2 is a block diagram illustrating the client computing device 115, according to an example embodiment. The client computing device 115 may include a processor 210. The processor 210 may be any of a variety of different types of commercially available processors suitable for mobile devices (for example, an XScale architecture microprocessor, a Microprocessor without Interlocked Pipeline Stages (MIPS) architecture processor, or another type of processor). A memory 220, such as a Random Access Memory (RAM), a Flash memory, or other type of memory, is typically accessible to the processor 210. The memory 220 may be adapted to store an operating system (OS) 230, as well as application programs 240, such as a mobile location enabled application that may provide LBSs to a user. The processor 210 may be coupled, either directly or via appropriate intermediary hardware, to a display 250 and to one or more input/output (I/O) devices 260, such as a keypad, a touch panel sensor, a microphone, and the like. Similarly, in some embodiments, the processor 210 may be coupled to a transceiver 270 that interfaces with an antenna 290. The transceiver 270 may be configured to both transmit and receive cellular network signals, wireless data signals, or other types of signals via the antenna 290, depending on the nature of the client computing device 115. In this manner, the connection with the communication network 105 may be established. Further, in some configurations, a GPS receiver 280 may also make use of the antenna 290 to receive GPS signals.

EXAMPLE PLATFORM ARCHITECTURE

Figure 3:
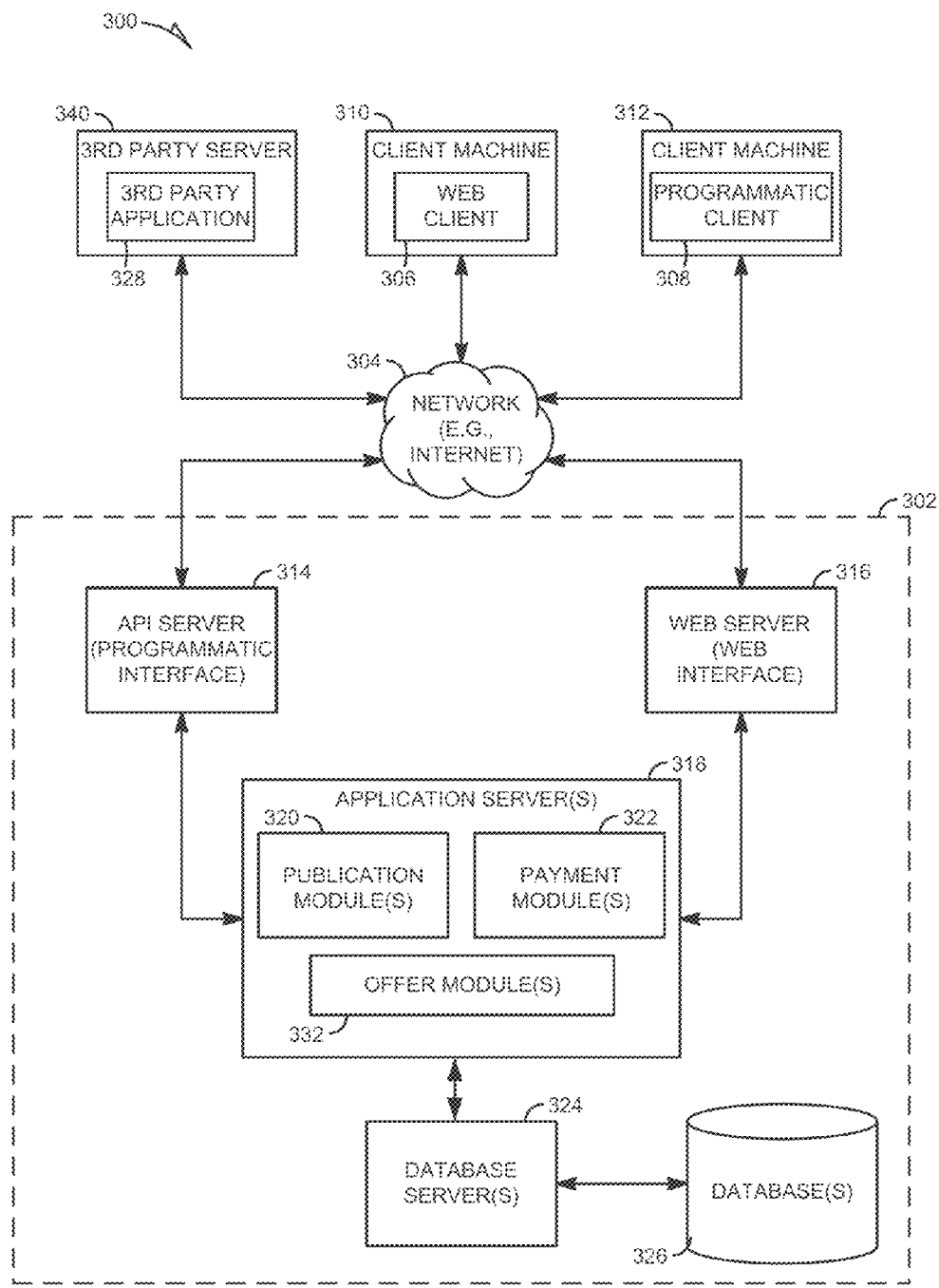
FIG. 3 is a block diagram illustrating a network-based system for processing a search query, and presenting search results (e.g., marketplace listings), as described more fully herein.

FIG. 3 is a block diagram illustrating a network-based system 300 for processing a search query, and presenting search results (e.g., marketplace listings), as described more fully herein. The block diagram depicts a network-based system 300 (in the exemplary form of a client-server system), within which an example embodiment can be deployed. A networked system 302 is shown, in the example form of a network-based location-aware publication, advertisement, or marketplace system, that provides server-side functionality, via a network 304 (e.g., the Internet or WAN) to one or more client machines 310, 312. FIG. 3 illustrates, for example, a web client 306 (e.g., a browser, such as the Internet Explorer browser developed by Microsoft Corporation of Redmond, Washington State) and a programmatic client 308 executing on respective client machines 310 and 312. In an example, the client machines 310 and 312 can be in the form of a mobile device, such as client computing device 115.

An Application Programming Interface (API) server 314 and a web server 316 are coupled to, and provide programmatic and web interfaces respectively to, one or more application servers 318. The application servers 318 host one or more publication modules 320 (in certain examples, these can also include search engine modules, commerce modules, advertising modules, and marketplace modules, to name a few), payment modules 322, and dynamic offer modules 332. The application servers 318 are, in turn, shown to be coupled to one or more database servers 324 that facilitate access to one or more databases 326. In some examples, the application server 318 can access the databases 326 directly without the need for a database server 324.

The publication modules 320 may provide a number of publication and search functions and services to users that access the networked system 302. The payment modules 322 may likewise provide a number of payment services and functions to users. The payment modules 322 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication modules 320, within retail locations, or within external online retail venues. The payment modules 322 may also be configured to present or facilitate a redemption of offers, generated by the dynamic offer modules 332, to a user during checkout (or prior to checkout, while the user is still actively shopping). The offer modules 332 may provide dynamic context sensitive offers (e.g., coupons or immediate discount deals on targeted products or services) to users of the networked system 302. The offer modules 332 can be configured to use all of the various communication mechanisms provided by the networked system 302 to present offer options to users. The offer options can be personalized based on current location, time of day, user profile data, past purchase history, or recent physical or online behaviors recorded by the network-based system 300, among other things (e.g., context information). While the publication modules 320, payment modules 322, and offer modules 332 are shown in FIG. 3 to all form part of the networked system 302, it will be appreciated that, in alternative embodiments, the payment modules 322 may form part of a payment service that is separate and distinct from the networked system 302. Additionally, in some examples, the offer modules 332 may be part of the payment service or may form an offer generation service separate and distinct from the networked system 302.

Further, while the system 300 shown in FIG. 3 employs a client-server architecture, the embodiments of the present invention are of course not limited to such an architecture, and could equally well find application in a distributed, or peer-to-peer, architecture system, for example. The various publication modules 320, payment modules 322, and offer modules 332 could also be implemented as standalone systems or software programs, which do not necessarily have networking capabilities.

The web client 306 accesses the various publication modules 320, payment modules 322, and offer modules 332 via the web interface supported by the web server 316. Similarly, the programmatic client 308 accesses the various services and functions provided by the publication modules 320, payment modules 322, and offer modules 332 via the programmatic interface provided by the API server 314. The programmatic client 308 may, for example, be a smartphone application that enables users to communicate search queries to the system 300 while leveraging user profile data and current location information provided by the smartphone or accessed over the network 304.

FIG. 3 also illustrates a third-party application 328, executing on a third-party server machine 340, as having programmatic access to the networked system 302 via the programmatic interface provided by the API server 314. For example, the third-party application 328 may, utilizing information retrieved from the networked system 302, support one or more features or functions on a website hosted by the third party. The third-party website may, for example, provide one or more promotional, marketplace or payment functions that are supported by the relevant applications of the networked system 302. Additionally, the third-party website may provide merchants with access to the offer modules 332 for configuration purposes. In certain examples, merchants can use programmatic interfaces provided by the API server 314 to develop and implement rules-based pricing schemes that can be implemented via the publication modules 320, payment modules 322, and offer modules 332.

EXAMPLE USER INTERFACES

Various example user interfaces will now be described illustrating various example embodiments. Some of these example embodiments are depicted as user interfaces running on a desktop or laptop computing device, such as a desktop or laptop computer. Other example embodiments are depicted as user interfaces running on mobile devices, such as smartphones or tablet computers. The various features depicted, however, can be utilized on any type of computing device and the presence of a feature in a mobile device embodiment, for example, will not limit that feature to only being used on mobile devices. The features can, in fact, be mixed and matched on any device.

Figure 4:
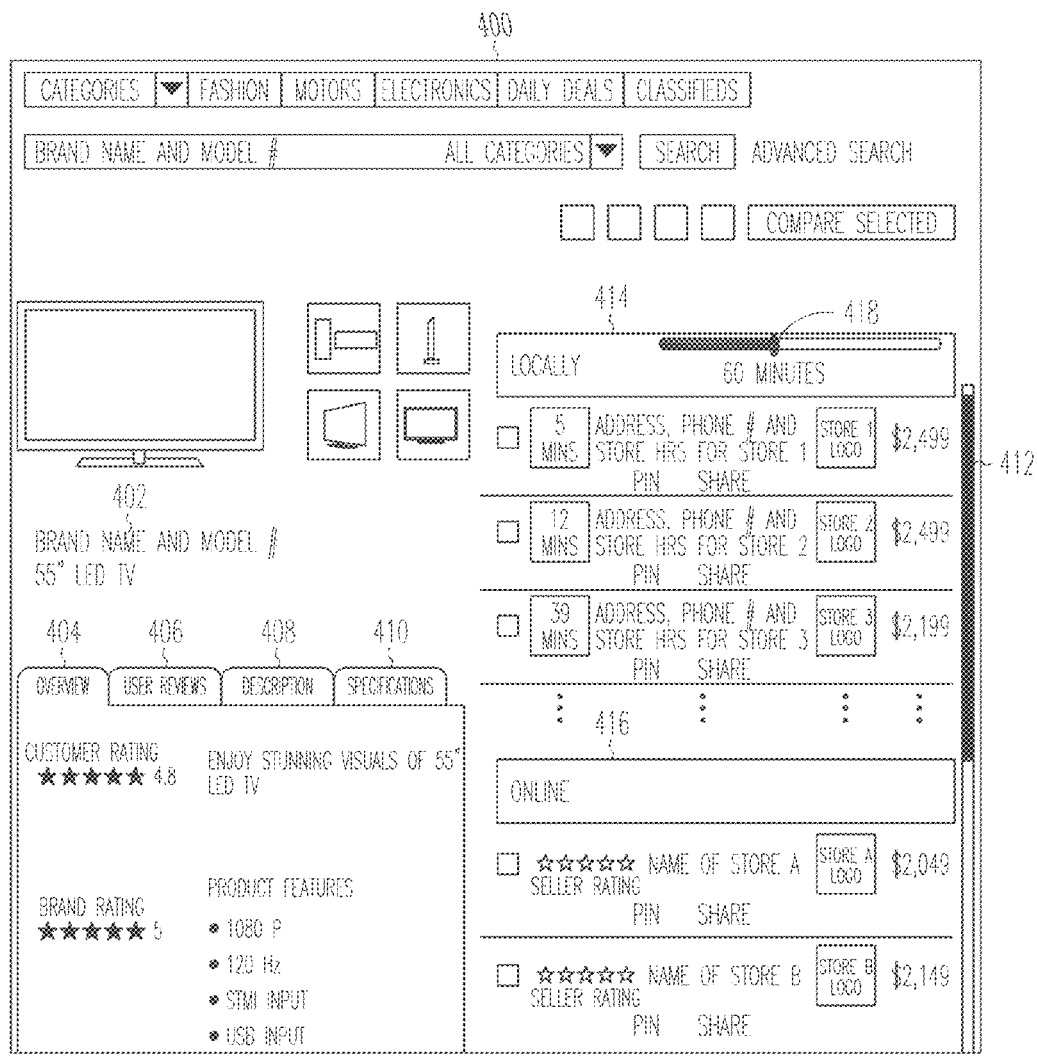
FIG. 4 illustrates an example user interface showing a product description page, consistent with some embodiments of the invention.

FIG. 4 illustrates an example user interface showing a product description page, consistent with some embodiments of the invention. In the example of FIG. 4, the page 400 describes a particular product, here with a product title 402. The description may include an overview tab 404, which describes a summary of the information in the other tabs, namely user reviews 406, a text description 408, and specifications 410. Also depicted on this page are marketplace results 412. The marketplace results 412 are listings of merchant pages from merchants who sell the product. Location information on the user may be used in displaying the marketplace results 412. Here, the marketplace results 412 are divided into local listings 414 and online results 416.

A slider 418 may be provided that allows the user to configure the radius which is defined as "local." Notably, this slider 418 is presented in terms of time, rather than distance. While users are typically presented information on the distance of items to their location, many users will be interested in more specific factors that are influenced by distance, but not necessarily by distance itself. For example, a user may not care that an item is 60 miles away, but rather may be more interested in how long it will take to drive (or walk, or take public transit) to travel to purchase the item. This is because many users are concerned with the amount of time it takes to purchase items locally versus online. Alternatively, a user who has plenty of time may not care as much about time or distance as such, but may be more interested in the fuel cost of traveling to purchase the item. As such, the slider 418 may present results that fall within the scope of a factor other than distance, but that distance affects, such as travel time or fuel costs. Here, time is depicted. If the user slides the slider 418 to the right, the number of minutes will increase, and potentially more marketplace results 412 will be displayed for local listings 414. Alternatively, if the user slides the slider 418 to the left, the number of minutes will decrease, and potentially fewer marketplace results 412 will be displayed for the local listings 414.

Figure 5:
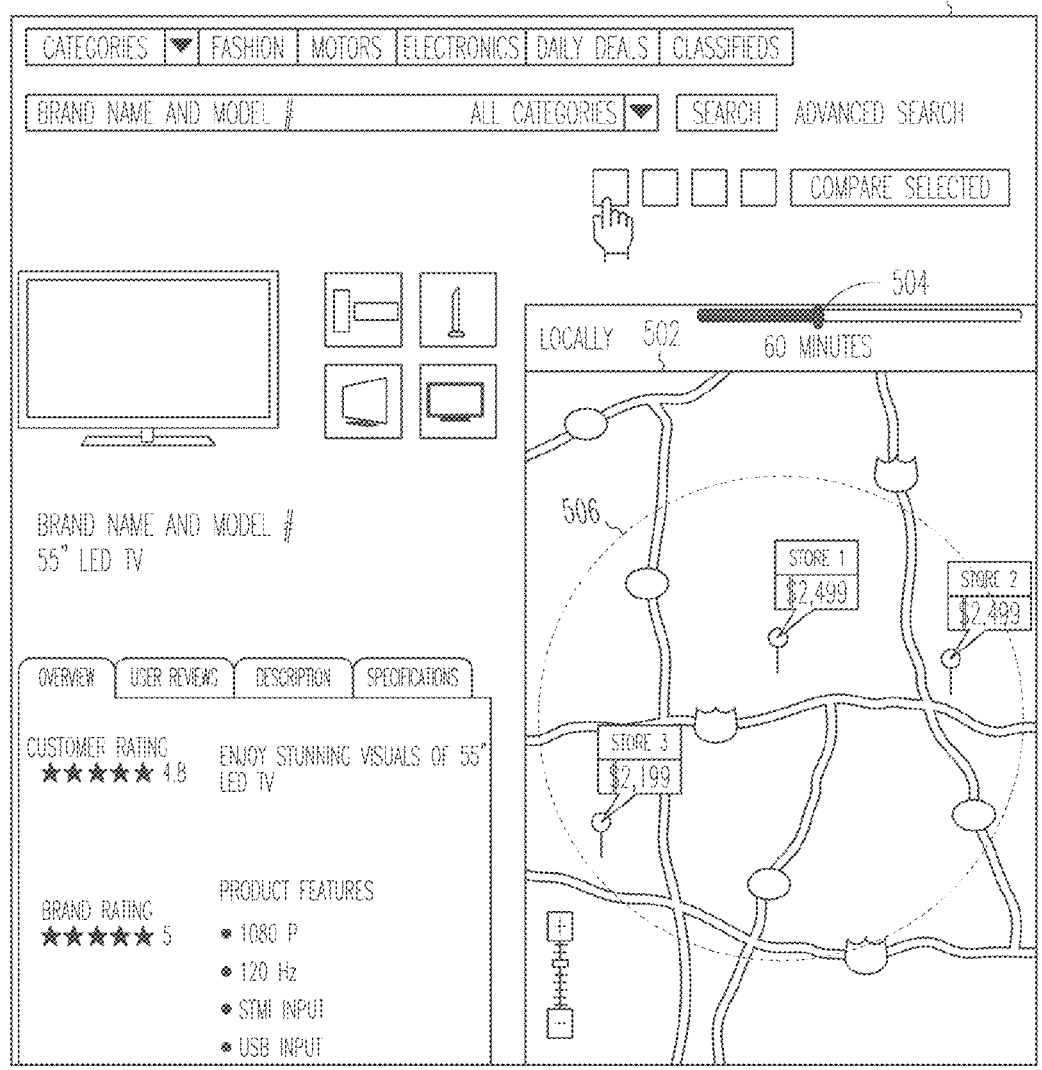
FIG. 5 illustrates an example user interface showing a product description page, consistent with some embodiments of the invention.

FIG. 5 illustrates an example user interface showing a product description page, consistent with some embodiments of the invention. In the example of FIG. 5, the page 500 depicts local marketplace results using a map view 502. Here, slider 504 can be used to alter the radius 506 of an area displayed on the map. It should be noted that in map view 502 it still may be beneficial to display local marketplace results that are outside of the radius 506, as long as the radius 506 is well visible. Alternatively, the system could filter the marketplace results so that only the results within the radius 506 are depicted. It should also be noted that while in this example the radius 506 is depicted as a true circle, given the fact that the slider 504 is used to alter results based on time (or alternatively on cost of travel), in reality the radius 506 may not be a circle but may be more erratic, due to the variances in travel time and cost due to road locations, road conditions, traffic, etc.

Figure 6:
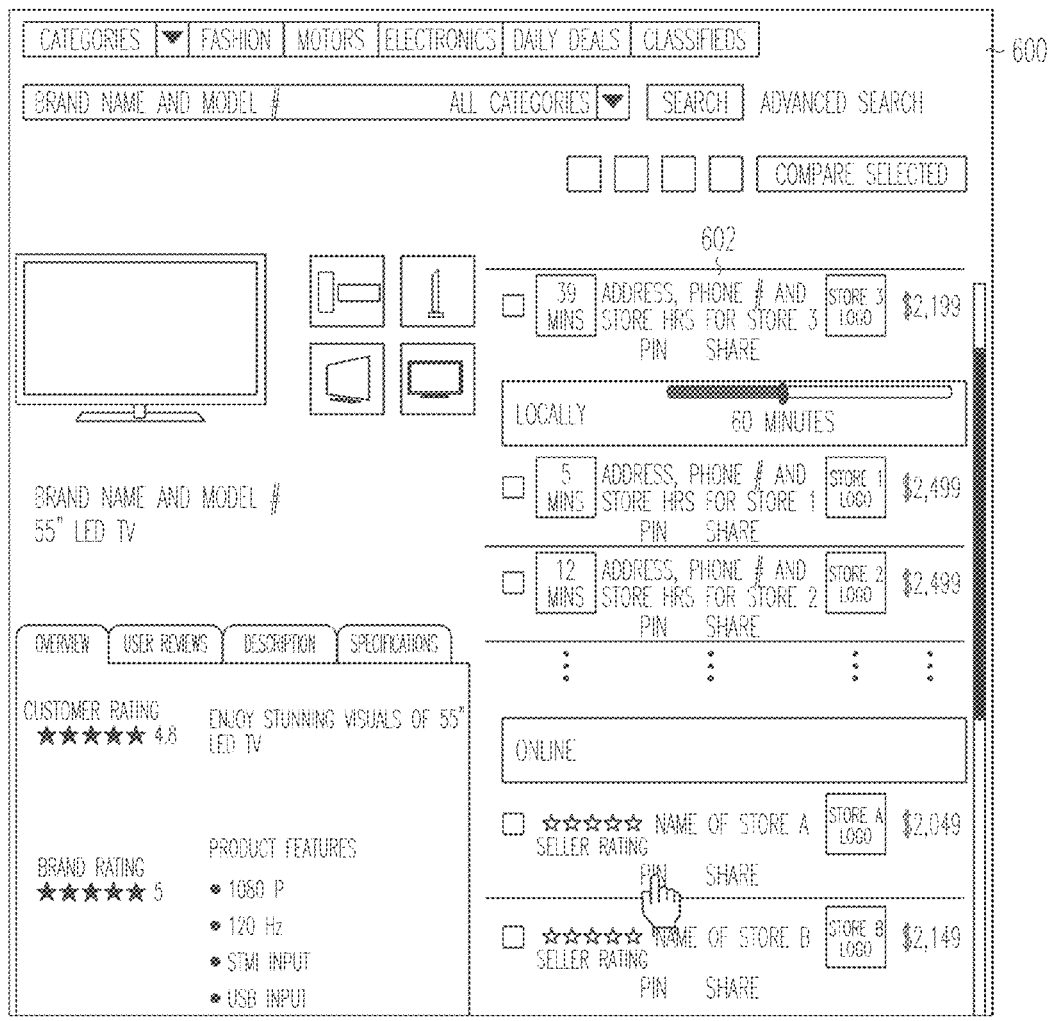
FIG. 6 illustrates an example user interface showing a product description page, consistent with some embodiments of the invention.

FIG. 6 illustrates an example user interface showing a product description page, consistent with some embodiments of the invention. This figure depicts a first stage in pinning marketplace results. In the example of FIG. 6, the user has selected one of the marketplace results on the page 600 by selecting on the result, which causes the result 602 to be placed at the top of the listings.

Figure 7:
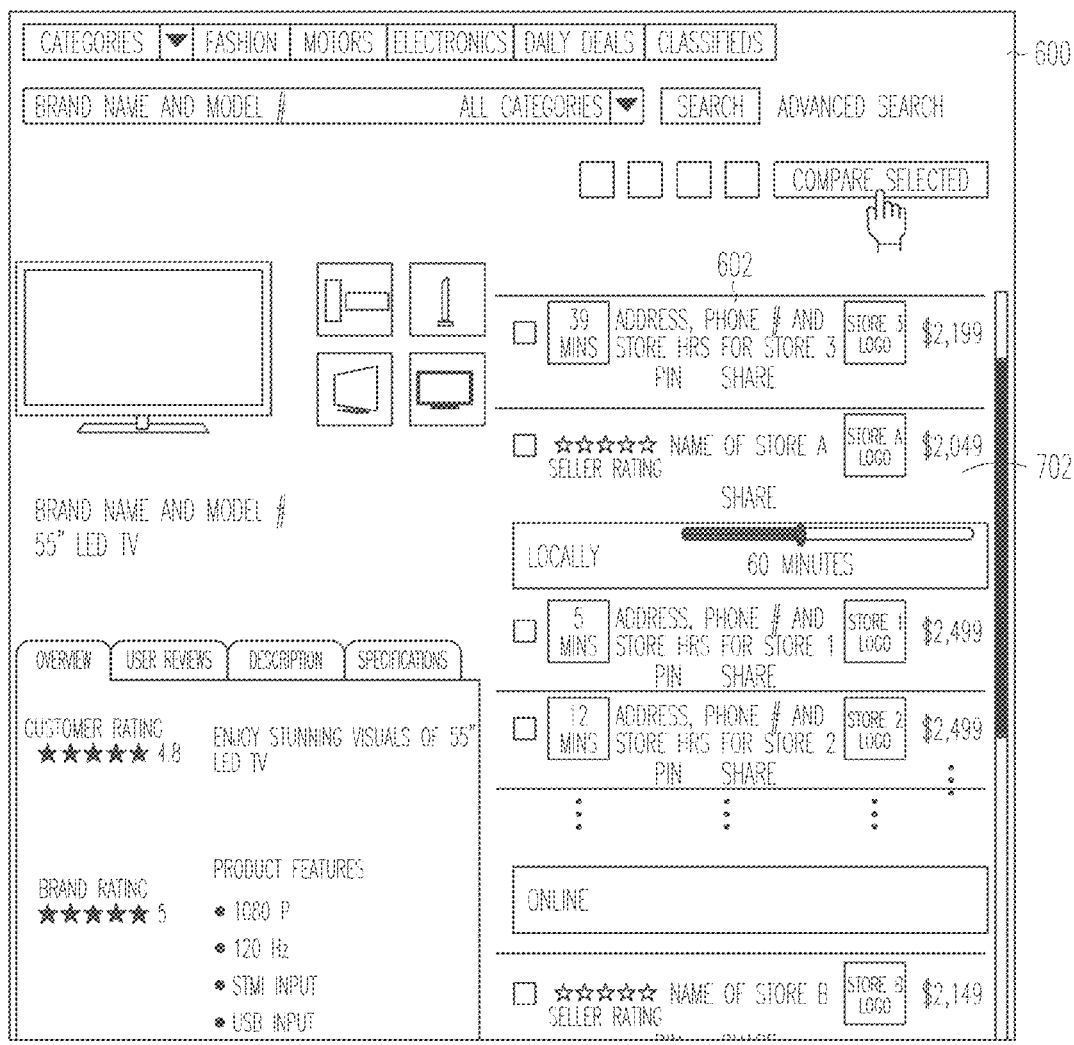
FIG. 7 illustrates an example user interface showing a product description page, consistent with some embodiments of the invention.

FIG. 7 illustrates an example user interface showing a product description page, consistent with some embodiments of the invention. This figure depicts a second stage in pinning marketplace results. In the example of FIG. 7, the user has selected another one of the marketplace results on the page 600 by selecting on the result, which causes the result 702 to be placed at the top of the listings with result 602.

Figure 8:
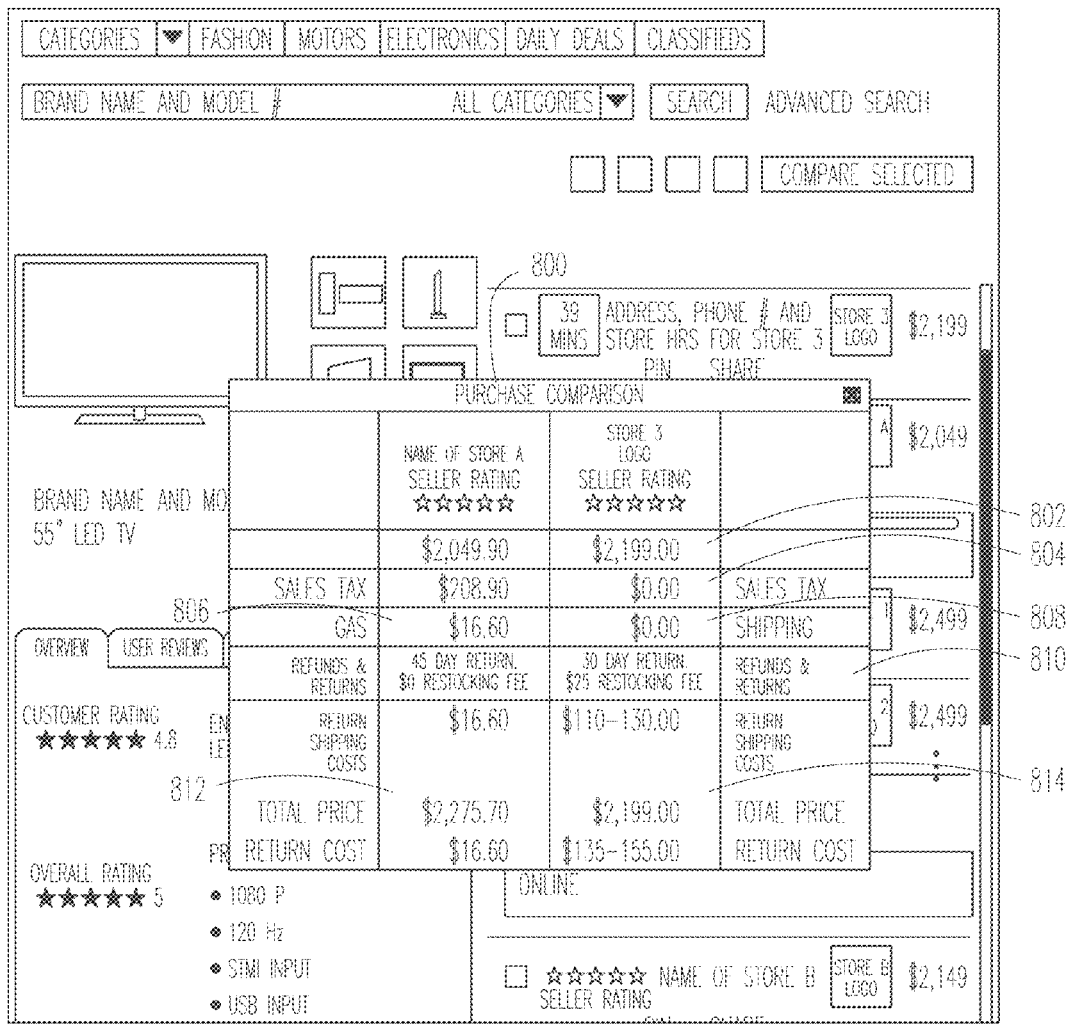
FIG. 8 illustrates an example user interface showing a purchase comparison window, consistent with some embodiments of the invention.

Pinning two or more results allows for a comparison view to provide a better understanding of true pricing and tradeoffs. The user, having pinned two or more such results, can hit a "compare" button to bring up a purchase comparison. FIG. 8 illustrates an example user interface showing a purchase comparison window, consistent with some embodiments of the invention. In the example of FIG. 8, the purchase comparison window 800 depicts a side-by-side comparison of purchase features of the product from the multiple result listings. Here, in addition to the underlying costs 802 of the item, the sales tax 804 (which can differ greatly between listings, especially when some retailers are located out of state), the cost of gas 806 (for a local merchant) versus the cost of shipping 808 for an online retailer, the return policies 810, and the cost of return transportation 812 or shipping 814. Some of these are features that may be important to a user, but are not currently displayed in prior art shopping interfaces.

Figure 9:
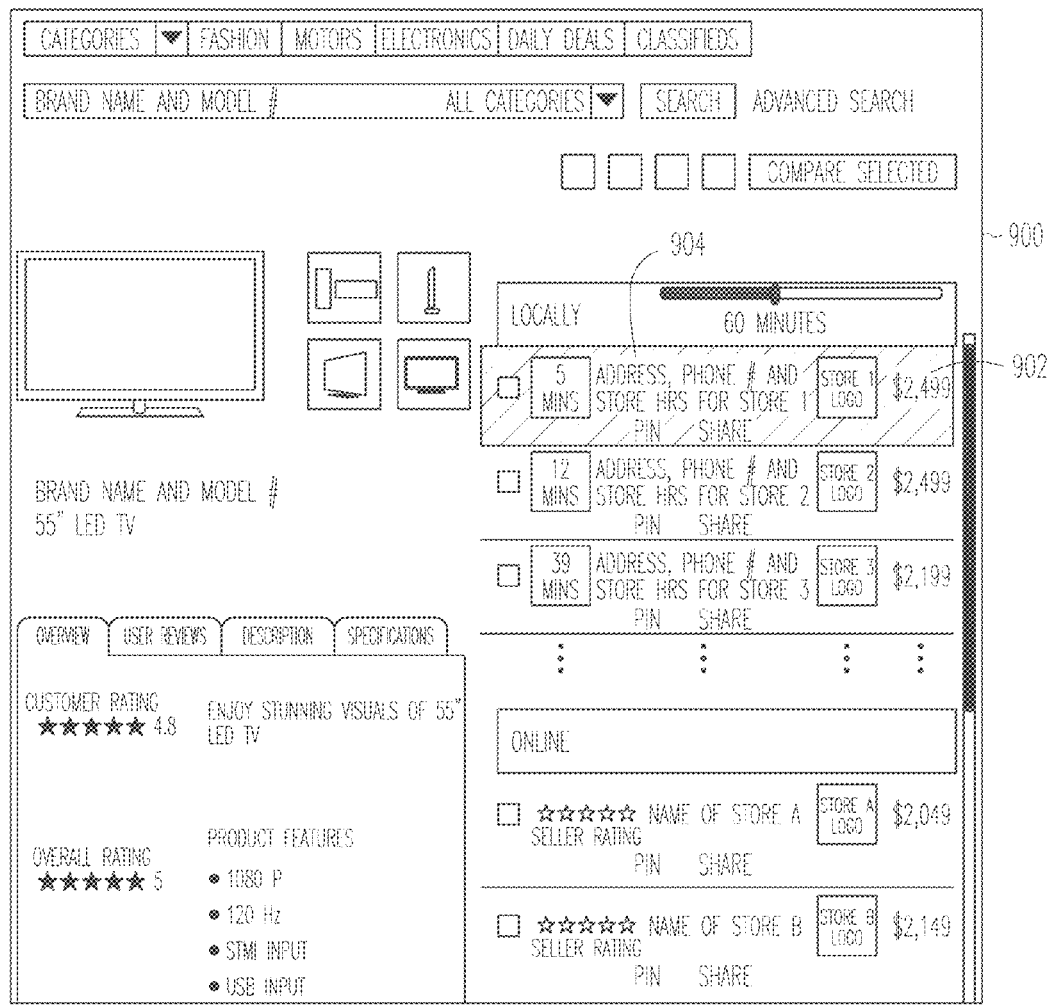
FIG. 9 illustrates an example user interface showing a product description page, consistent with some embodiments of the invention.

Selecting one of the results may cause a product card to be displayed. FIG. 9 illustrates an example user interface showing a product description page, consistent with some embodiments of the invention. This figure depicts a product description page 900 where a user has selected 902 one of the marketplace results 904.

Figure 10:
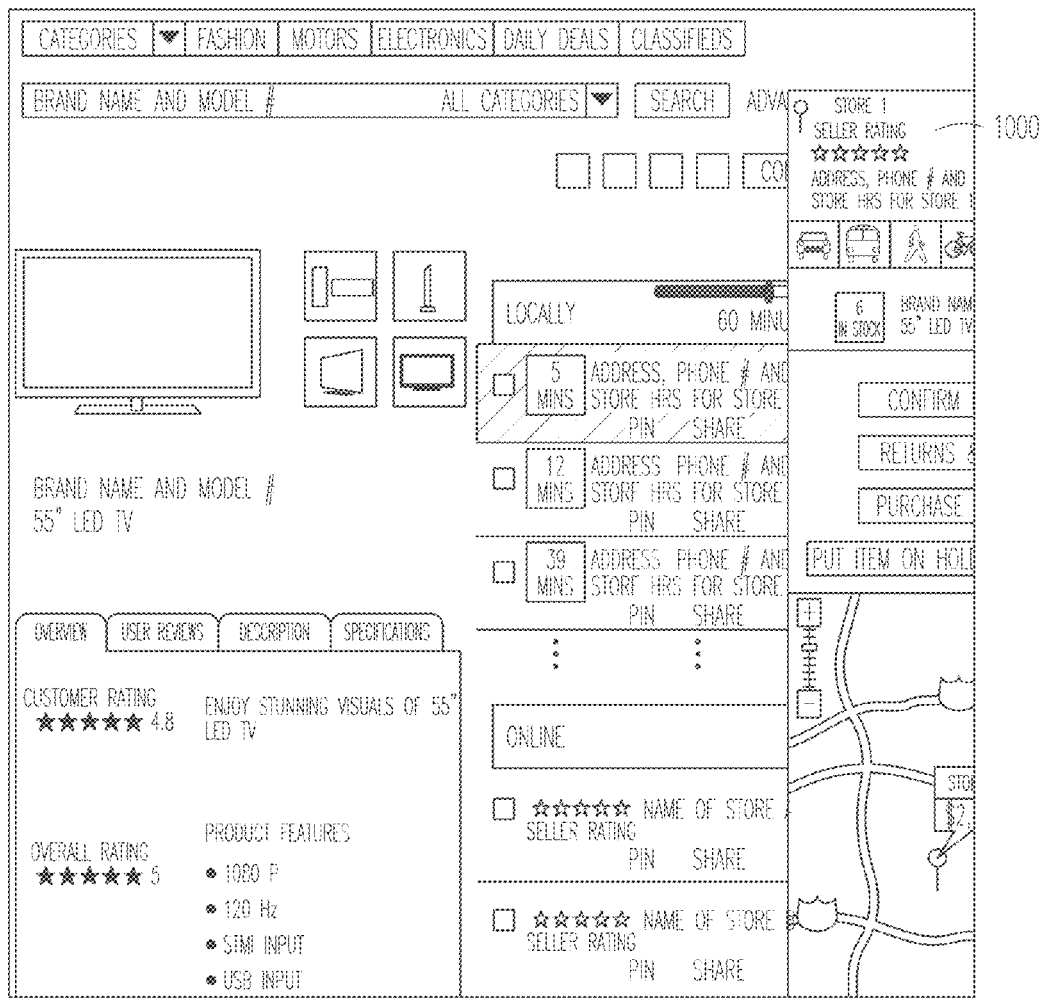
FIG. 10 illustrates an example user interface showing a product card, consistent with some embodiments of the invention.

FIG. 10 illustrates an example user interface showing a product card, consistent with some embodiments of the invention. As a result of a user selecting one of the marketplace results, a product card 1000 begins to slide into view.

Figure 11:
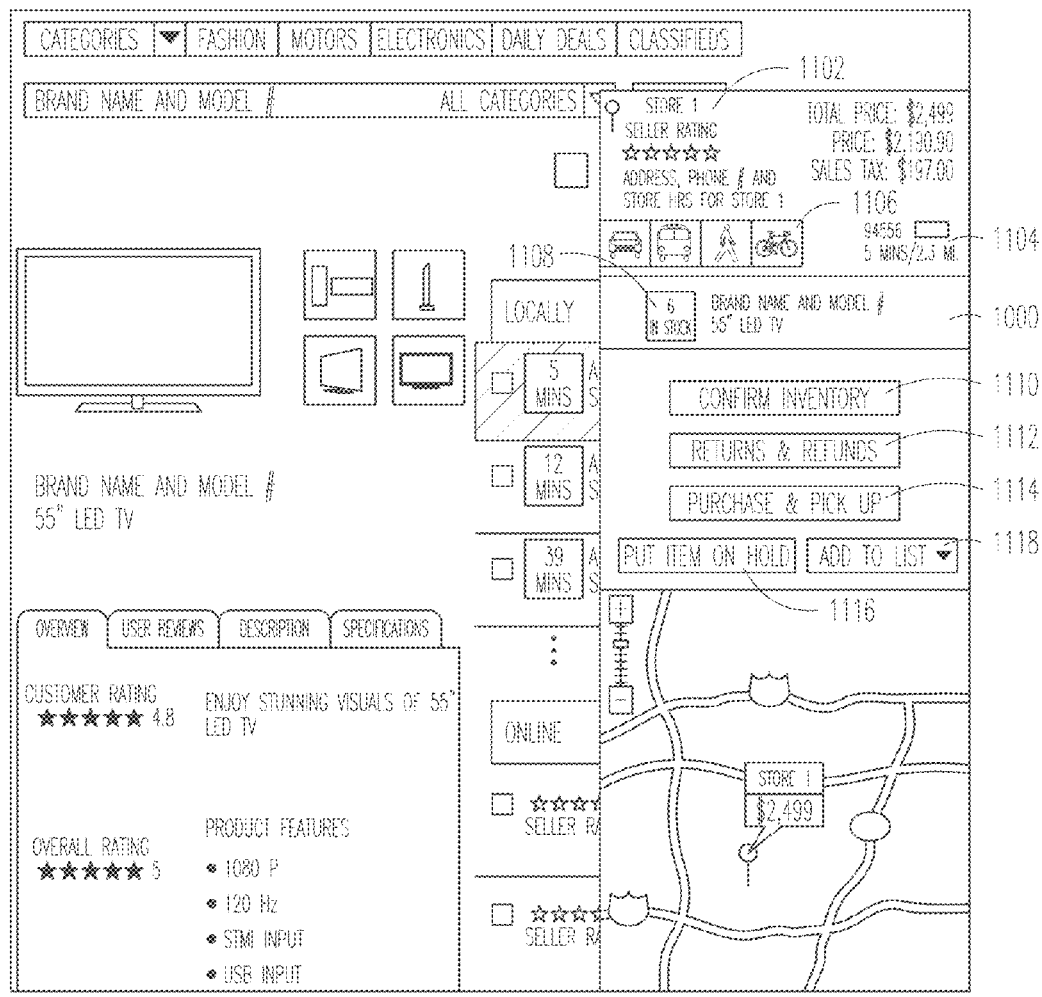
FIG. 11 illustrates an example user interface showing a product card, consistent with some embodiments of the invention.

FIG. 11 illustrates an example user interface showing a product card, consistent with some embodiments of the invention. Here, the product card 1000 has completely slid into view. The product card 1000 may contain several buttons that allow the user to make a final determination of whether to purchase the item from the retailer associated with this marketplace result. A retailer rating 1102 may provide feedback as to previous users' experiences with the retailer. A time listing 1104 may detail exactly how long it will take for the user to travel to the retailer. This time listing 1104 may be based on travel by various modes of transportation (e.g., car, public transportation, walking, or bicycle) selectable by the buttons 1106. Additionally, an inventory quantity 1108 listing may specify how many of the item the retailer has in stock. A confirm inventory button 1110 may be used to contact the retailer to confirm that the inventory is correct (reducing the chances that the user may travel to the retailer only to find out that the item is sold out) A returns and refunds button 1112 may be used to determine information about the return policy of the merchant. A purchase and pick up button 1114 may alert the retailer that the user has purchased the item and to have it available for pickup. Alternatively, the user may put the item on hold using a put item on hold button 1116, or simply add the item to a wish list using an add to list button 1118.

Figure 12:
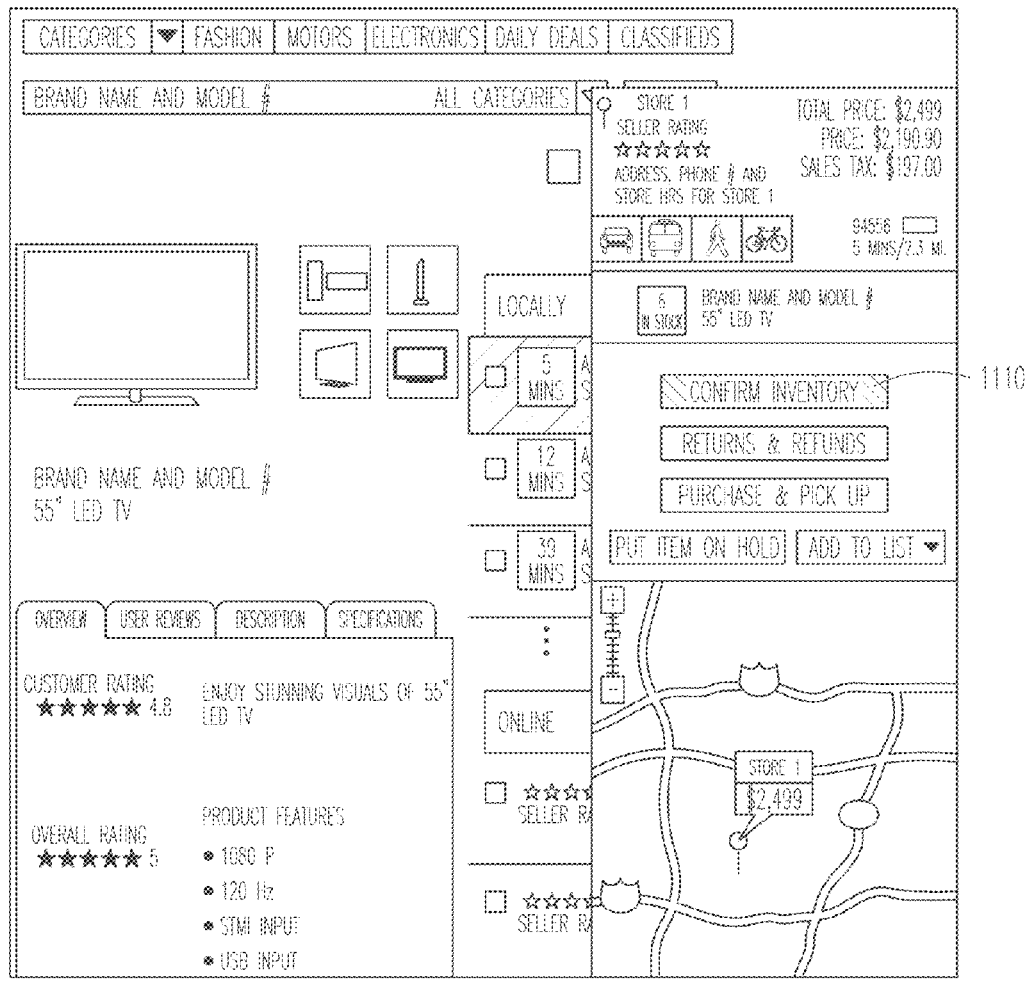
FIG. 12 illustrates an example user interface showing a product card, consistent with some embodiments of the invention.

FIG. 12 illustrates an example user interface showing a product card, consistent with some embodiments of the invention. Here the user has selected the confirm inventory button 1110.

Figure 13:
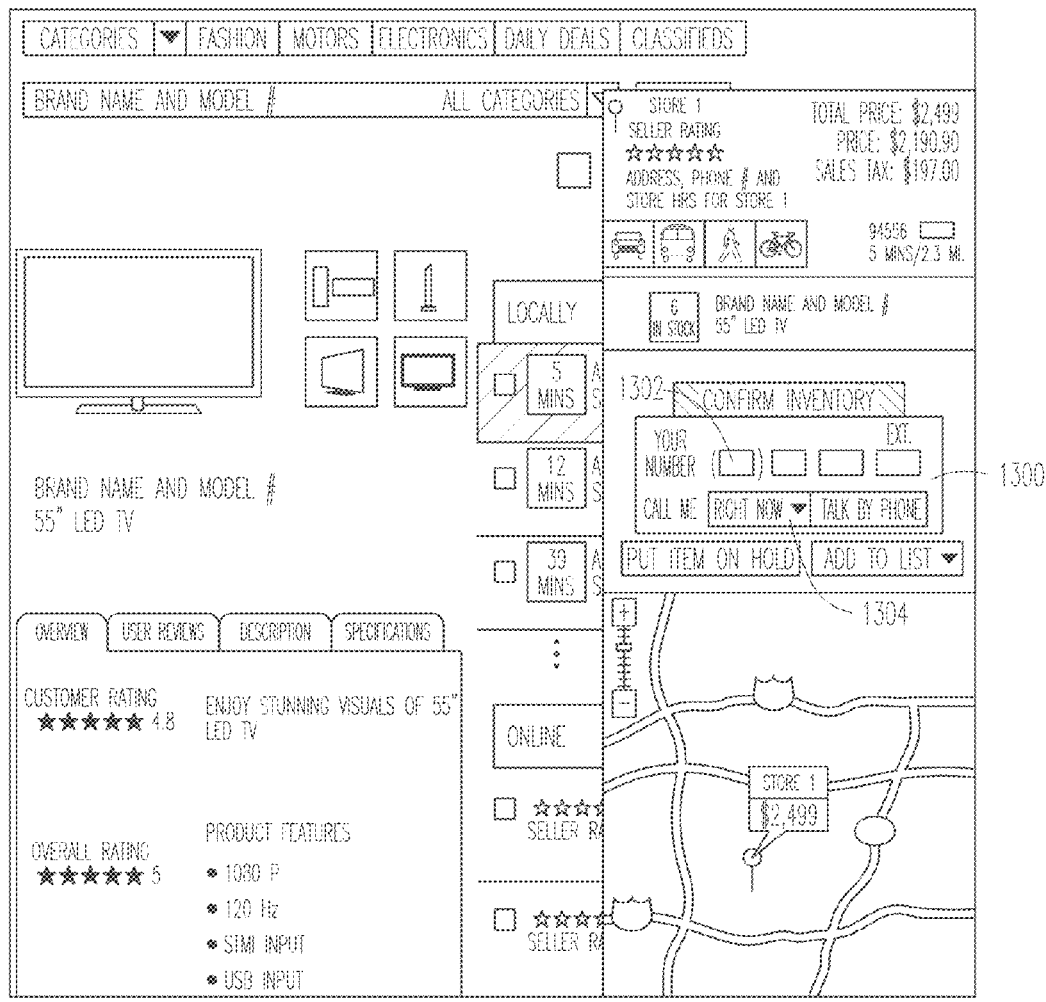
FIG. 13 illustrates an example user interface showing a product card, consistent with some embodiments of the invention.

FIG. 13 illustrates an example user interface showing a product card, consistent with some embodiments of the invention. Here, once the user has selected the confirm inventory button 1110, a confirm inventory window 1300 appears with a location 1302 where the user can enter a phone number and another location 1304 where the user can select when he or she wishes to receive a phone call to confirm the inventory from the retailer.

Figure 14:
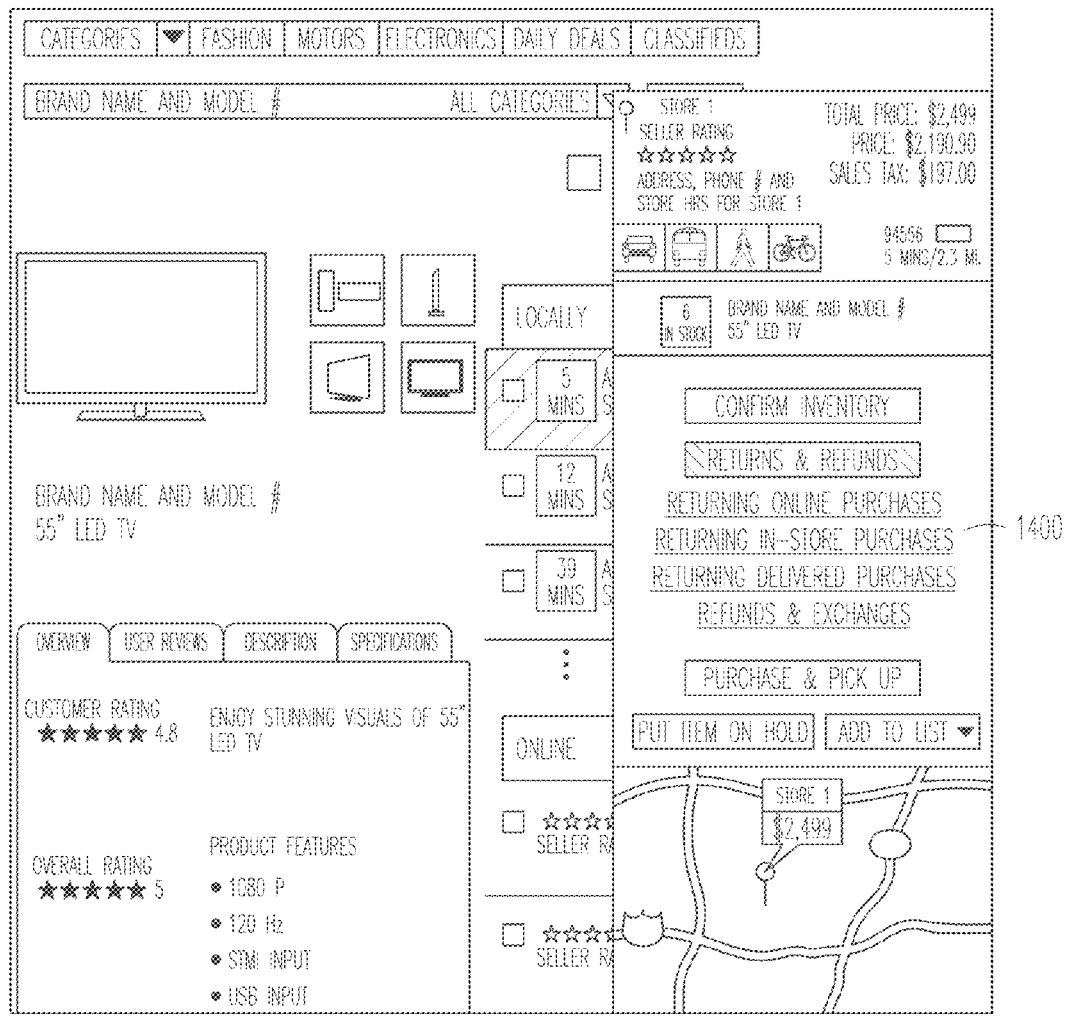
FIG. 14 illustrates an example user interface showing a product card, consistent with some embodiments of the invention.

FIG. 14 illustrates an example user interface showing a product card, consistent with some embodiments of the invention. Here, the user has selected a returns and refunds button, and is presented with a returns and refunds window 1400 with links to various return and refund policies of the retailer.

Figure 15:
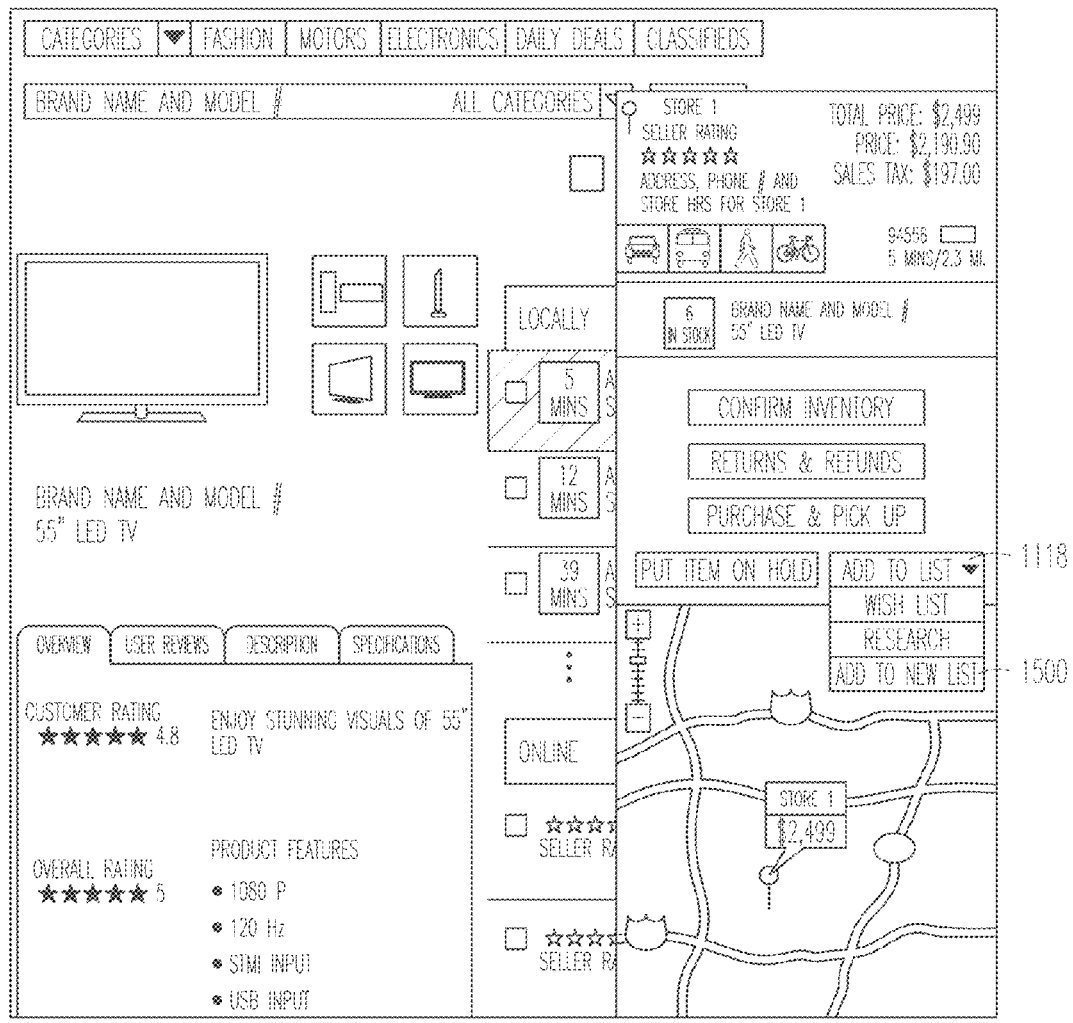
FIG. 15 illustrates an example user interface showing a product card, consistent with some embodiments of the invention.

FIG. 15 illustrates an example user interface showing a product card, consistent with some embodiments of the invention. Here, the user has selected the add to list button 1118, and is presented with a drop-down menu 1500 with selections of a list to which to add the item.

Figure 16:
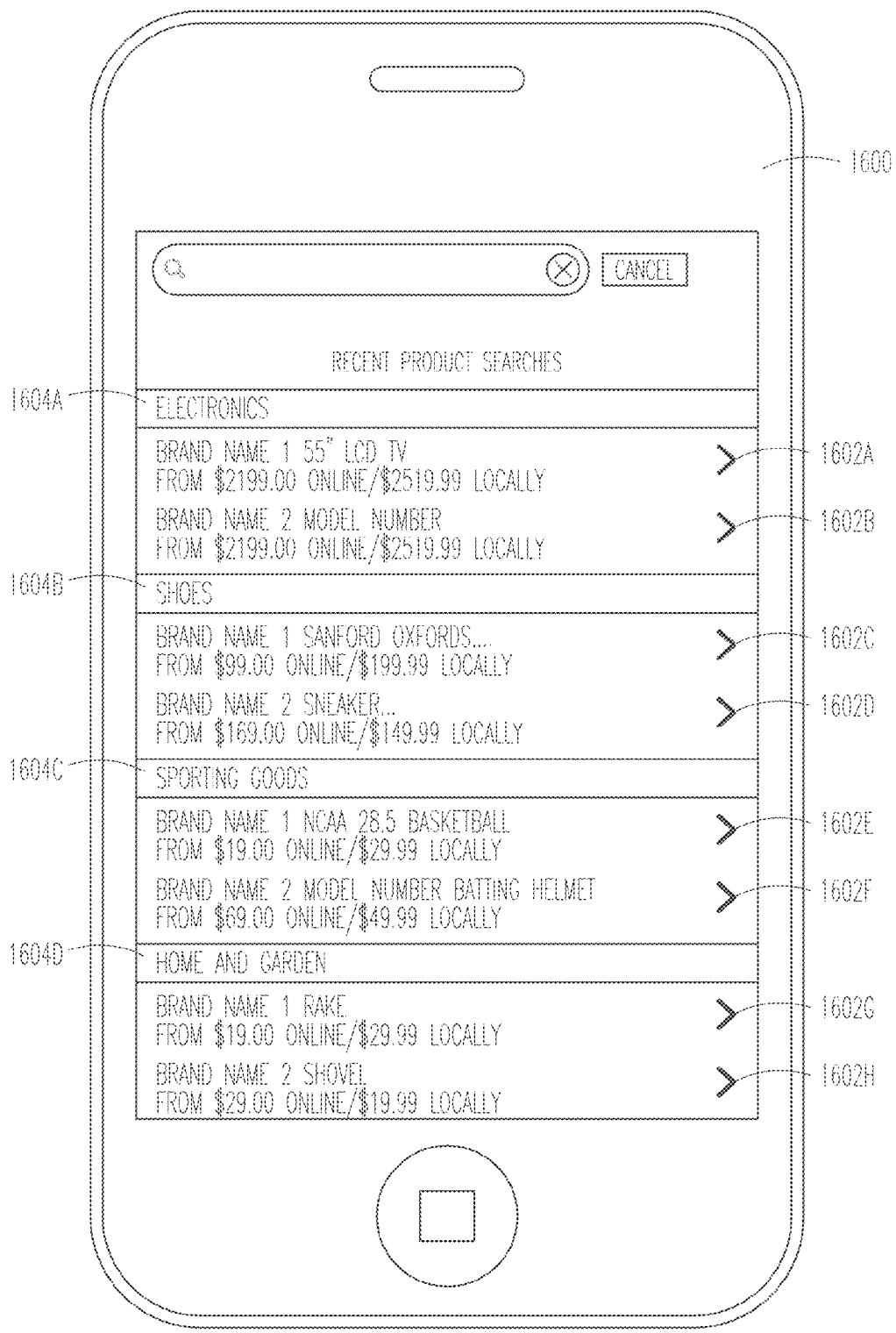
FIG. 16 illustrates another user interface showing a product search page, consistent with some embodiments of the invention.

FIG. 16 illustrates another user interface showing a product search page, consistent with some embodiments of the invention. Here, the user has previously performed a series of searches. These searches may have been performed on this device or on another device. The previous experiences may be extended by persisting the recent product searches, allowing the user to easily pick up where he or she left off, no matter which device he or she is using at the moment. Pictured here is a mobile device 1600, one which product search results 1602*a*-1602*h* can be displayed, in various categories 1604*a*-1604*d*.

Figure 17:
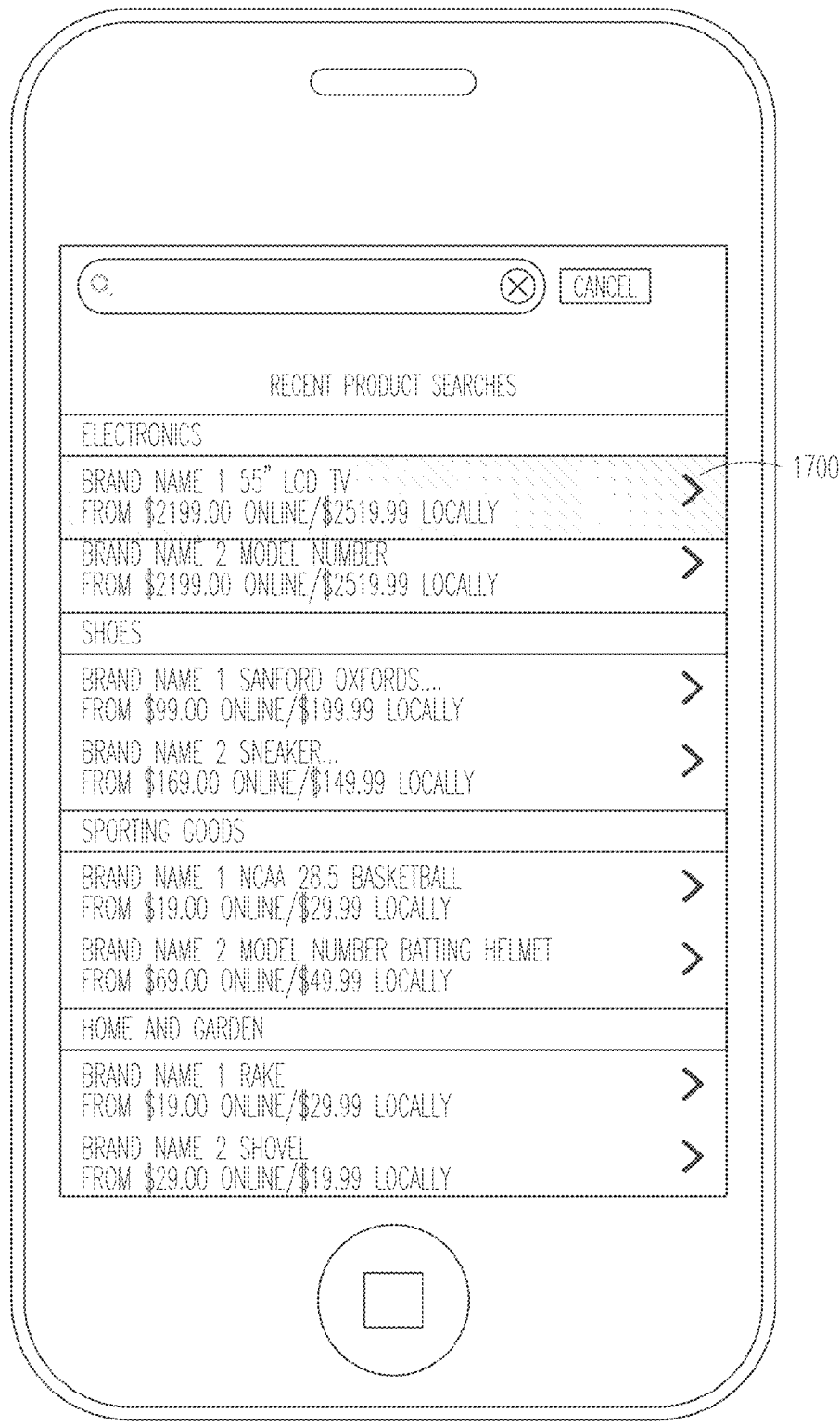
FIG. 17 illustrates a user interface showing a product search page, consistent with some embodiments of the invention.

FIG. 17 illustrates a user interface showing a product search page, consistent with some embodiments of the invention. Here, the user has made a selection 1700 of one of the product search results.

Figure 18:
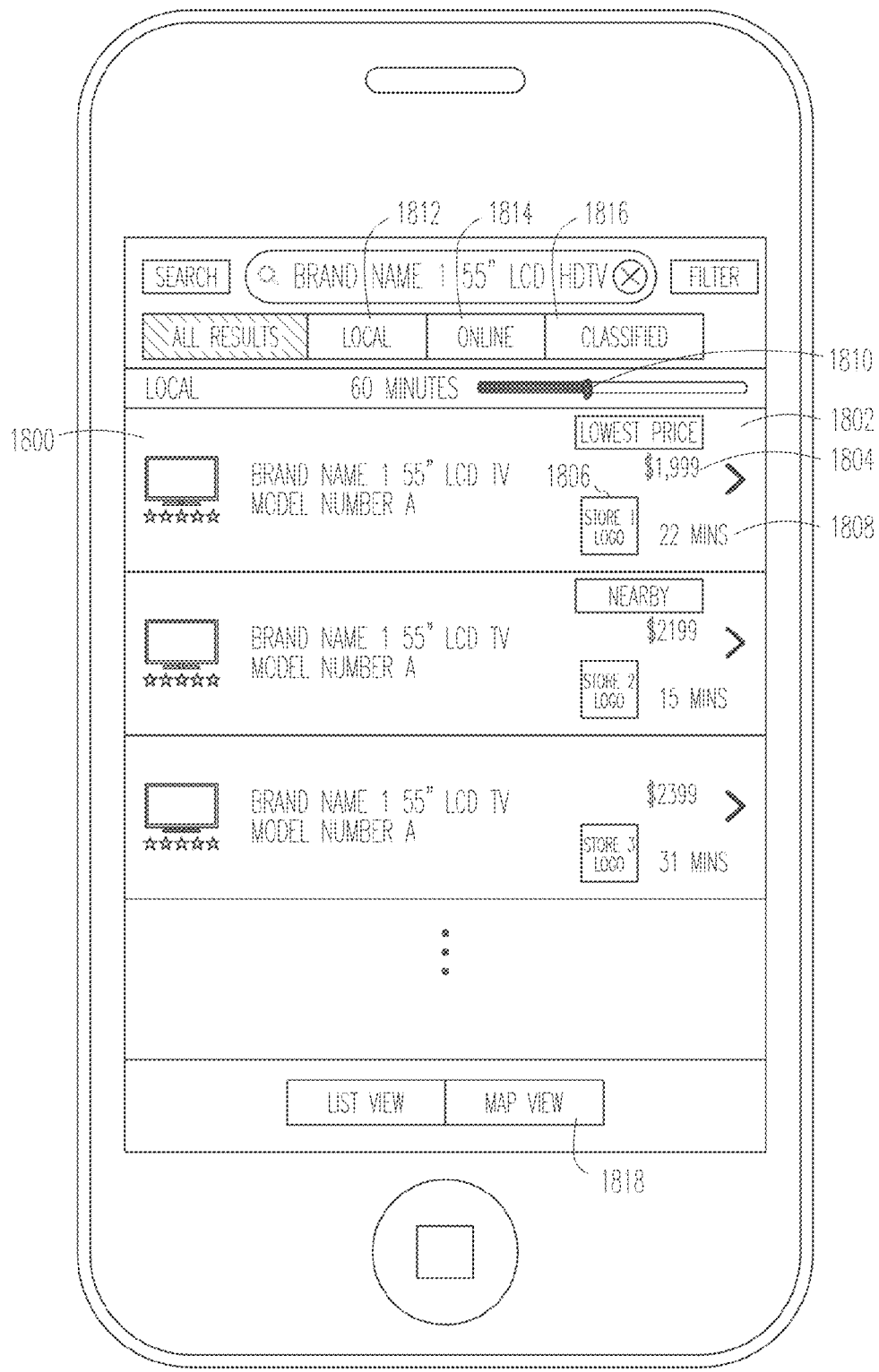
FIG. 18 illustrates another user interface showing a product description page, consistent with some embodiments of the invention.

FIG. 18 illustrates another user interface showing a product description page, consistent with some embodiments of the invention. This figure depicts the page that is caused to be displayed by the user selecting one of the product search results. Displayed here are marketplace results for the selected product. In other words, these show various retailers who sell the selected product. The page 1800 is made up of a series of marketplace results 1802. Each marketplace result 1802 contains various information, such as price 1804, retailer identification 1806, and travel time 1808 (in the case of a local merchant). The page 1800 also allows the user to narrow the results 1802 based on travel time to the merchant, using the slider 1810. The page 1800 also allows the user to select between local results 1812, online results 1814, and classified results 1816 (i.e., listings from private parties. The user can also select between a list view (pictured here) and a map view, using the selector button 1818.

Figure 19:
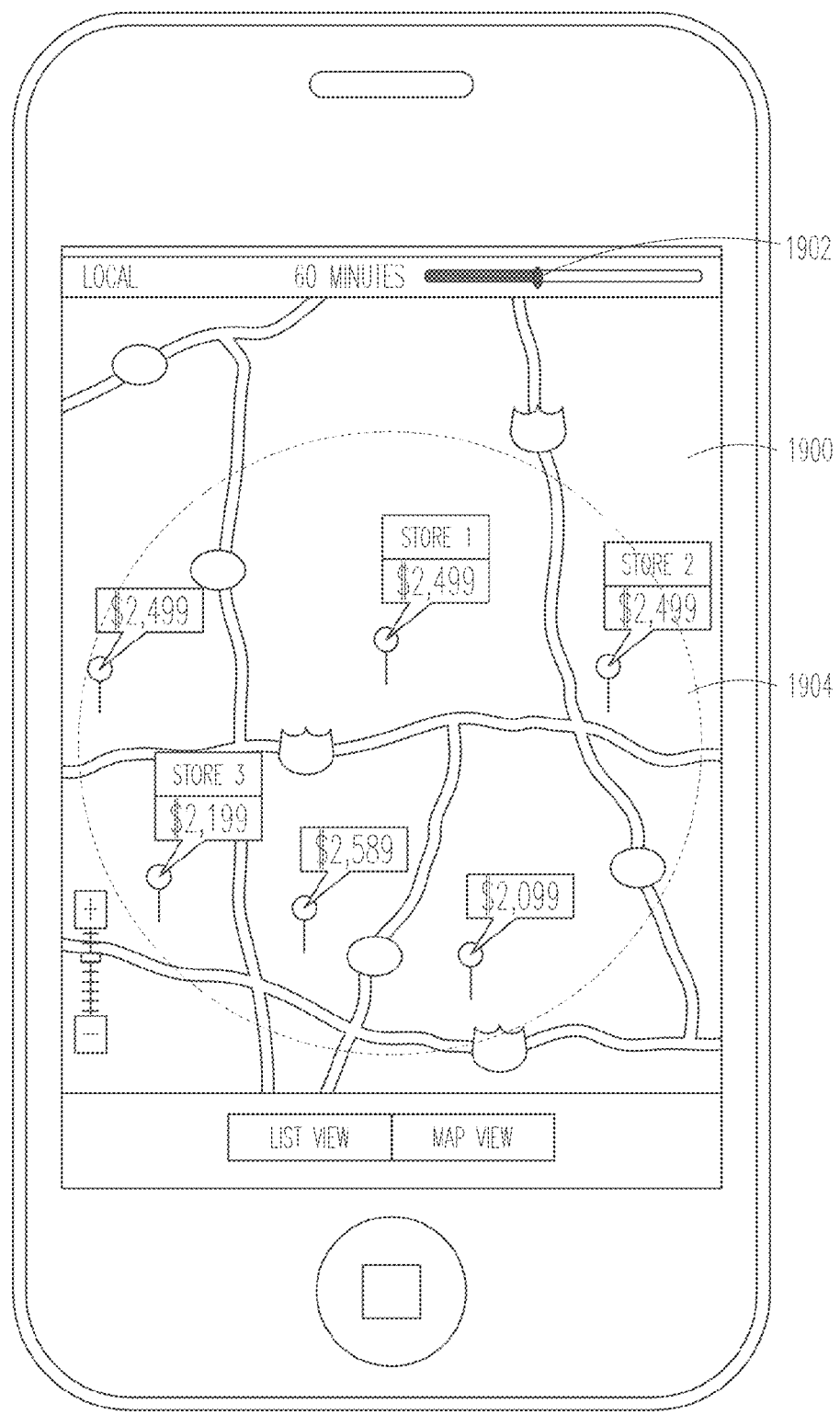
FIG. 19 illustrates another user interface showing a product description page, consistent with some embodiments of the invention.

FIG. 19 illustrates another user interface showing a product description page, consistent with some embodiments of the invention. Here, a map view 1900 is provided. A slider 1902 can be used to alter the radius 1904 of an area displayed on the map. It should be noted that while in this example the radius 1904 is depicted as a true circle, given the fact that the slider 1902 is used to alter results based on time (or alternatively on cost of travel), in reality the radius 1904 may not be a circle but may be more erratic, due to the variances in travel time and cost due to road locations, road conditions, traffic, etc.

Figure 20:
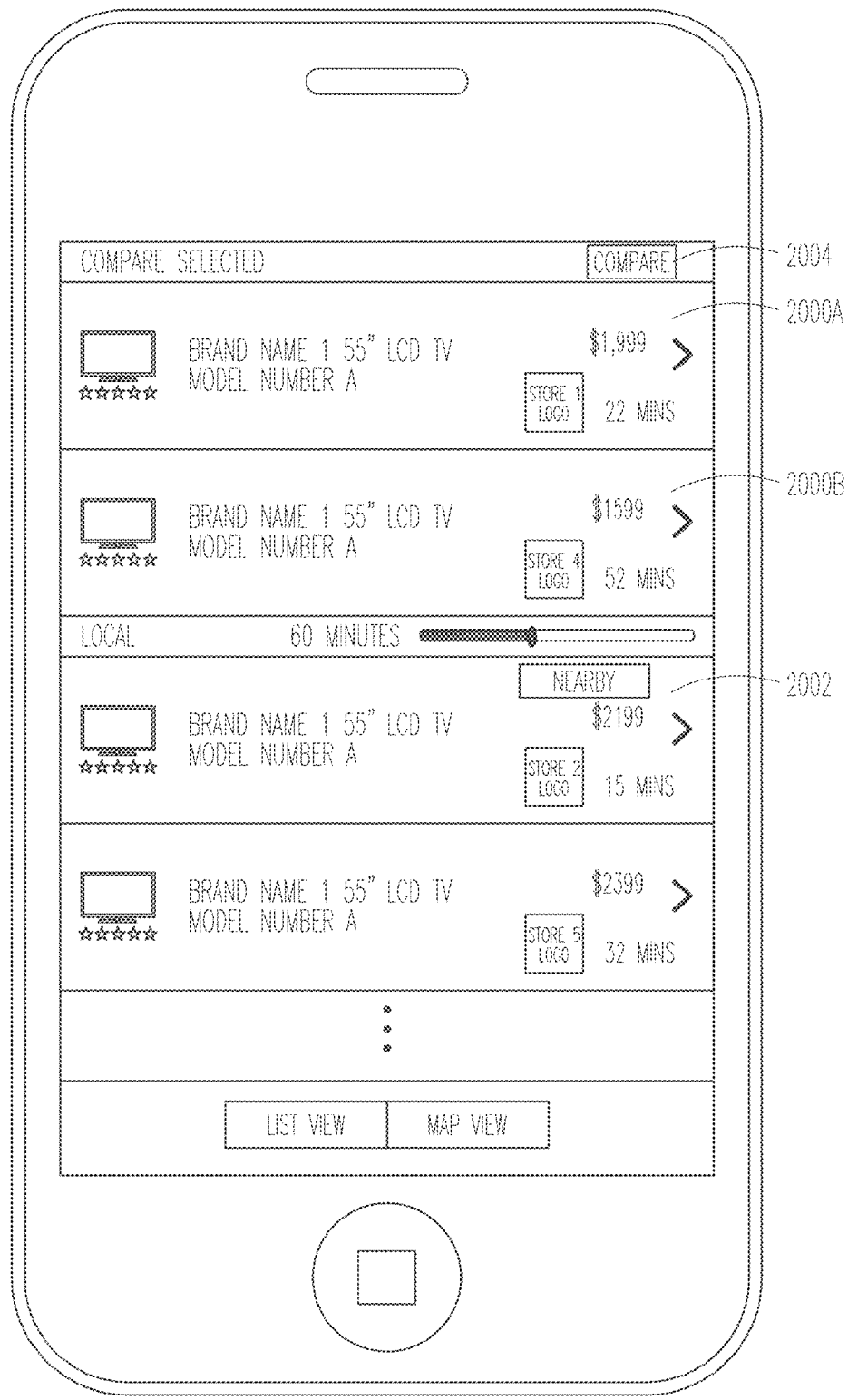
FIG. 20 illustrates an example user interface showing a product description page, consistent with some embodiments of the invention.
Figure 21:
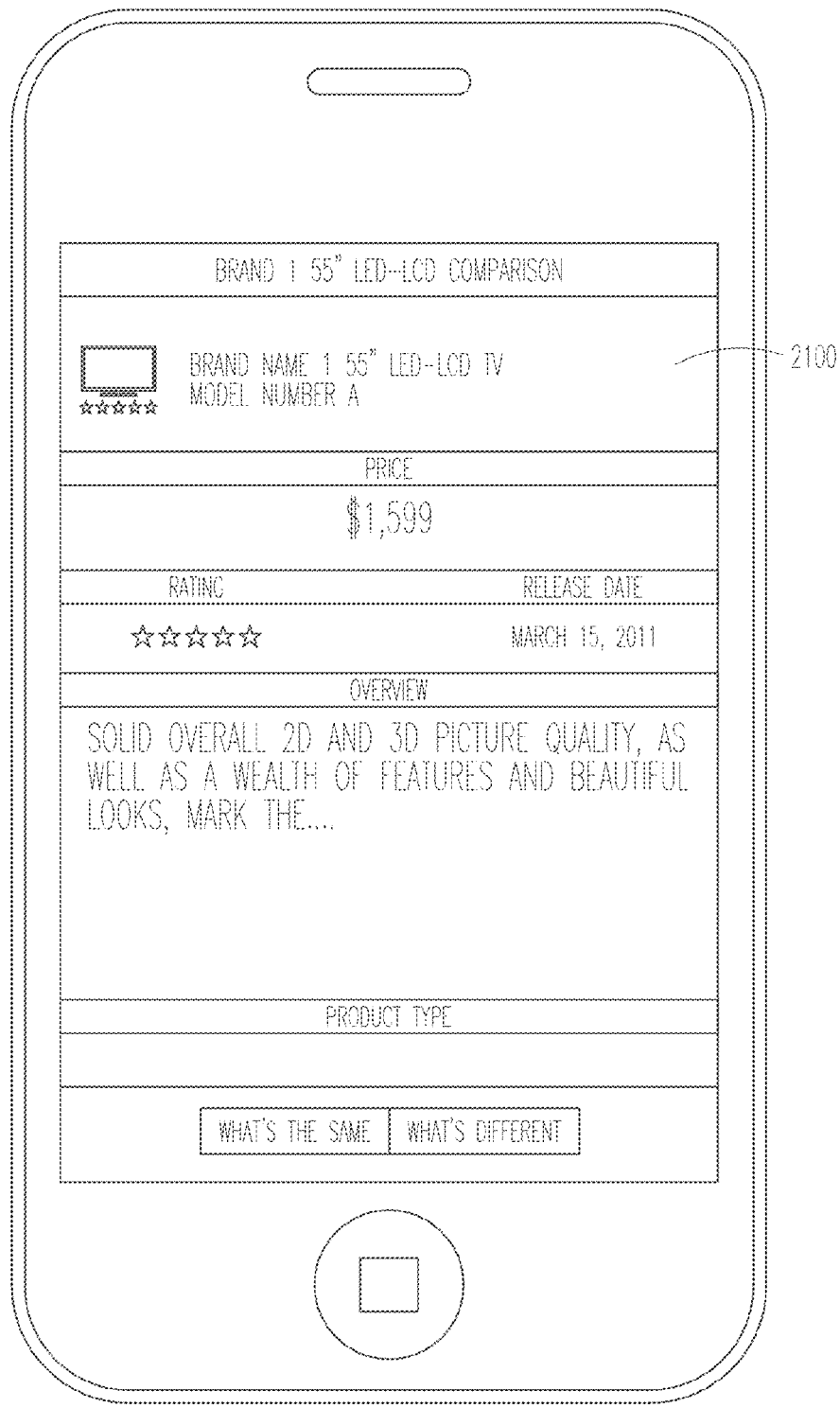
FIG. 21 illustrates an example user interface showing a purchase comparison page, consistent with some embodiments of the invention.

FIG. 20 illustrates an example user interface showing a product description page, consistent with some embodiments of the invention. This figure depicts the pinning of marketplace results. In the example of FIG. 20, the user has pinned two marketplace results 2000a, 2000b on the page 2002 by selecting on the results, which causes the results 2000a, 2000b to be placed at the top of the listings. As described earlier, pinning two or more results allows for a comparison view to better understand true pricing and tradeoffs. The user, having pinned two or more such results, can hit a "compare" button 2004 to bring up a purchase comparison. FIG. 21 illustrates an example user interface showing a purchase comparison page, consistent with some embodiments of the invention. In the example of FIG. 21, the purchase comparison page 2100 depicts one of the pinned products. The user can navigate through pinned products by "swiping" on the touchscreen of the user device (i.e., placing a finger on the touchscreen and moving the finger to the left or right).

Figure 22:
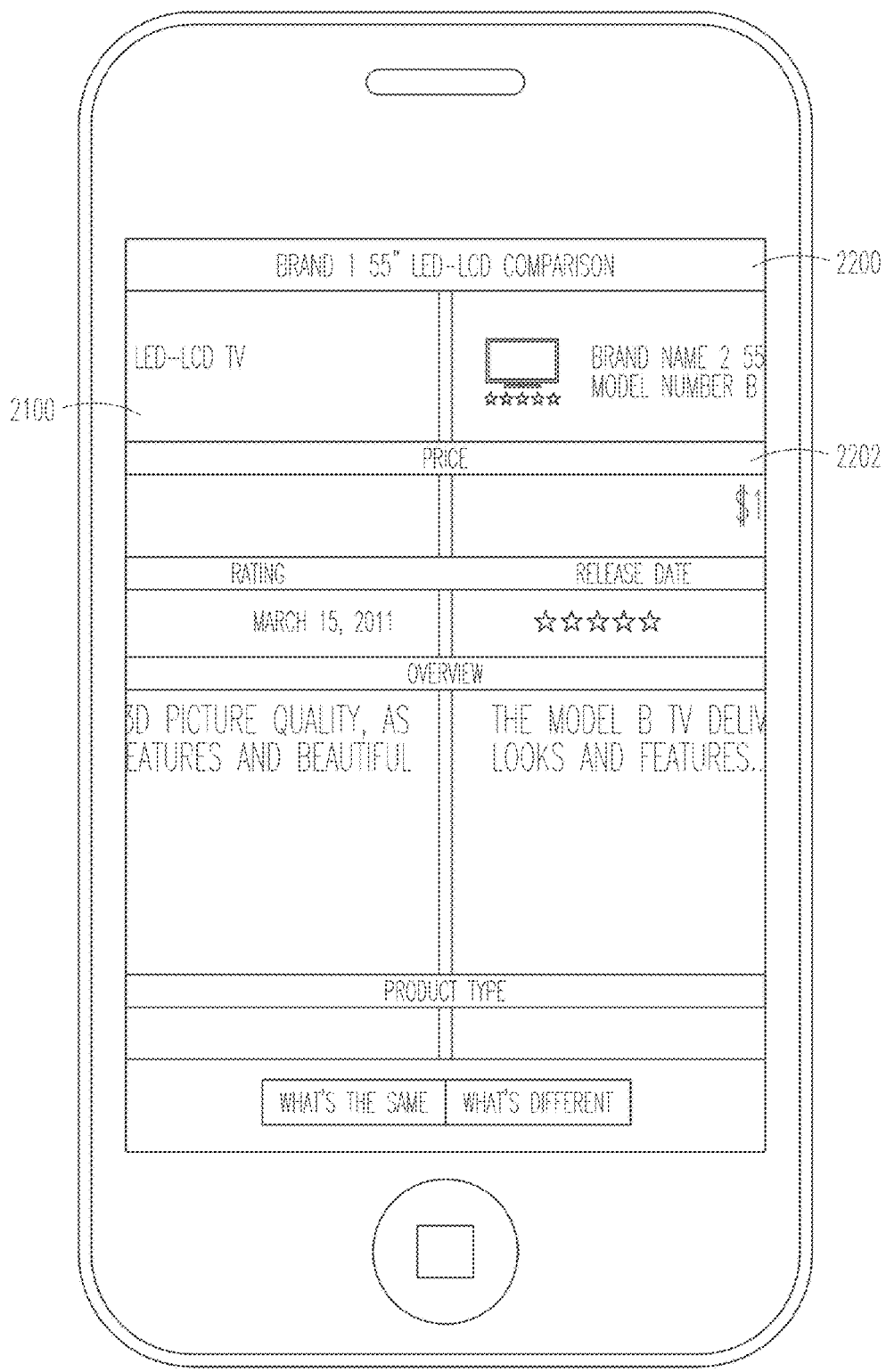
FIG. 22 illustrates an example user interface showing a purchase comparison page, consistent with some embodiments of the invention.
Figure 23:
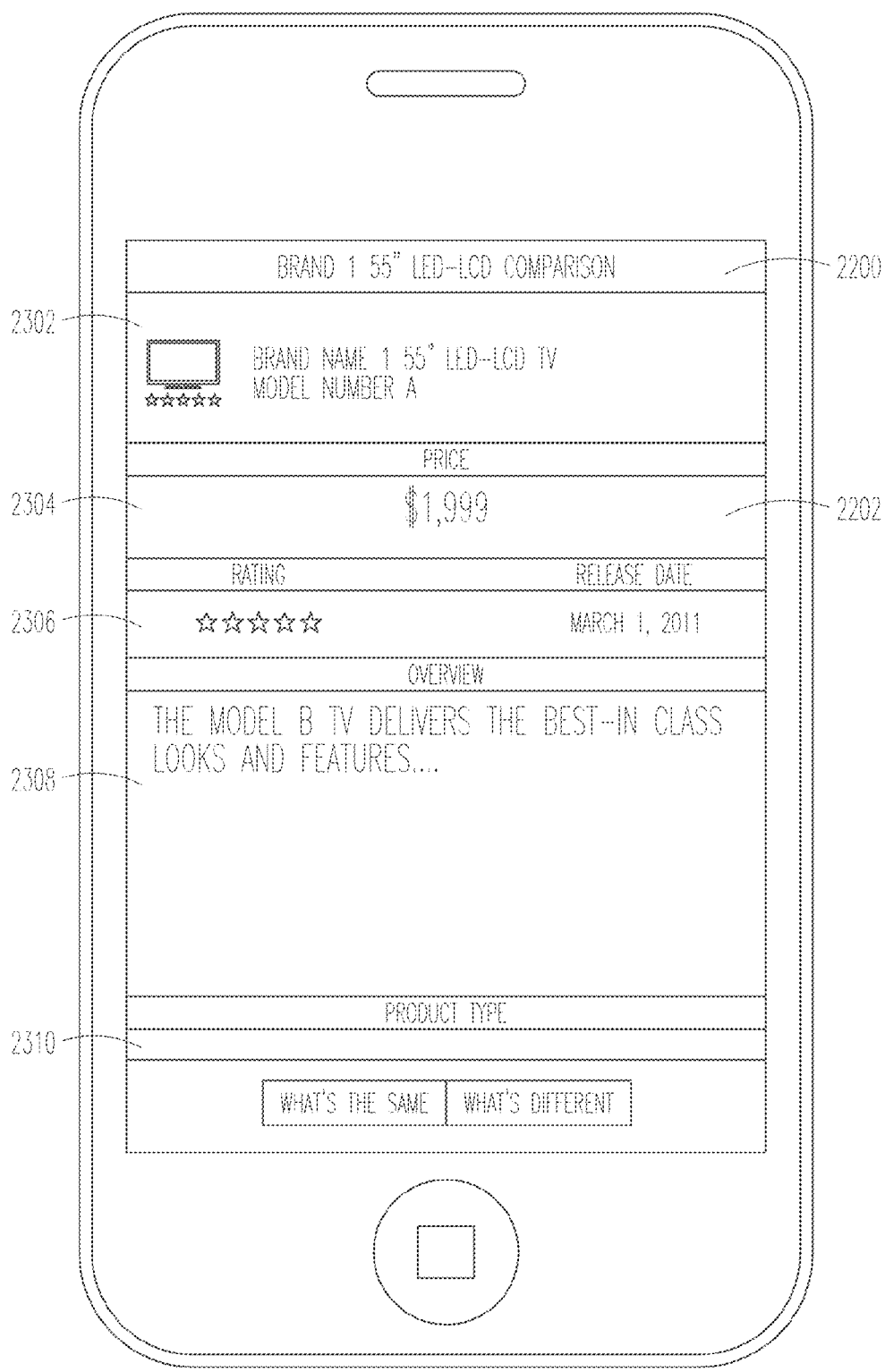
FIG. 23 illustrates an example user interface showing a purchase comparison page, consistent with some embodiments of the invention.

FIG. 22 illustrates an example user interface showing a purchase comparison page, consistent with some embodiments of the invention. Here, the user has "swiped" his or her finger to the left, resulting in the user interface 2200 beginning to transition between the first product purchase comparison page 2100 and the second product comparison page 2202. FIG. 23 illustrates an example user interface showing a purchase comparison page, consistent with some embodiments of the invention. Here, the user interface 2200 has completely transitioned to the second product comparison page 2202. Notably, when swiping occurs, the same types of information are presented in the same rows. For example, the first row 2302 may depict the product title, the second row 2304 may depict the price, the third row 2306 may depict a rating and release date, the fourth row 2308 may depict an overview, the fifth row 2310 may depict a product type, and so on. This allows the user to easily transition between the product comparison pages and compare the same attribute in each. The user may also "swipe up", resulting in more of the product comparison page 2202 being revealed.

Figure 24:
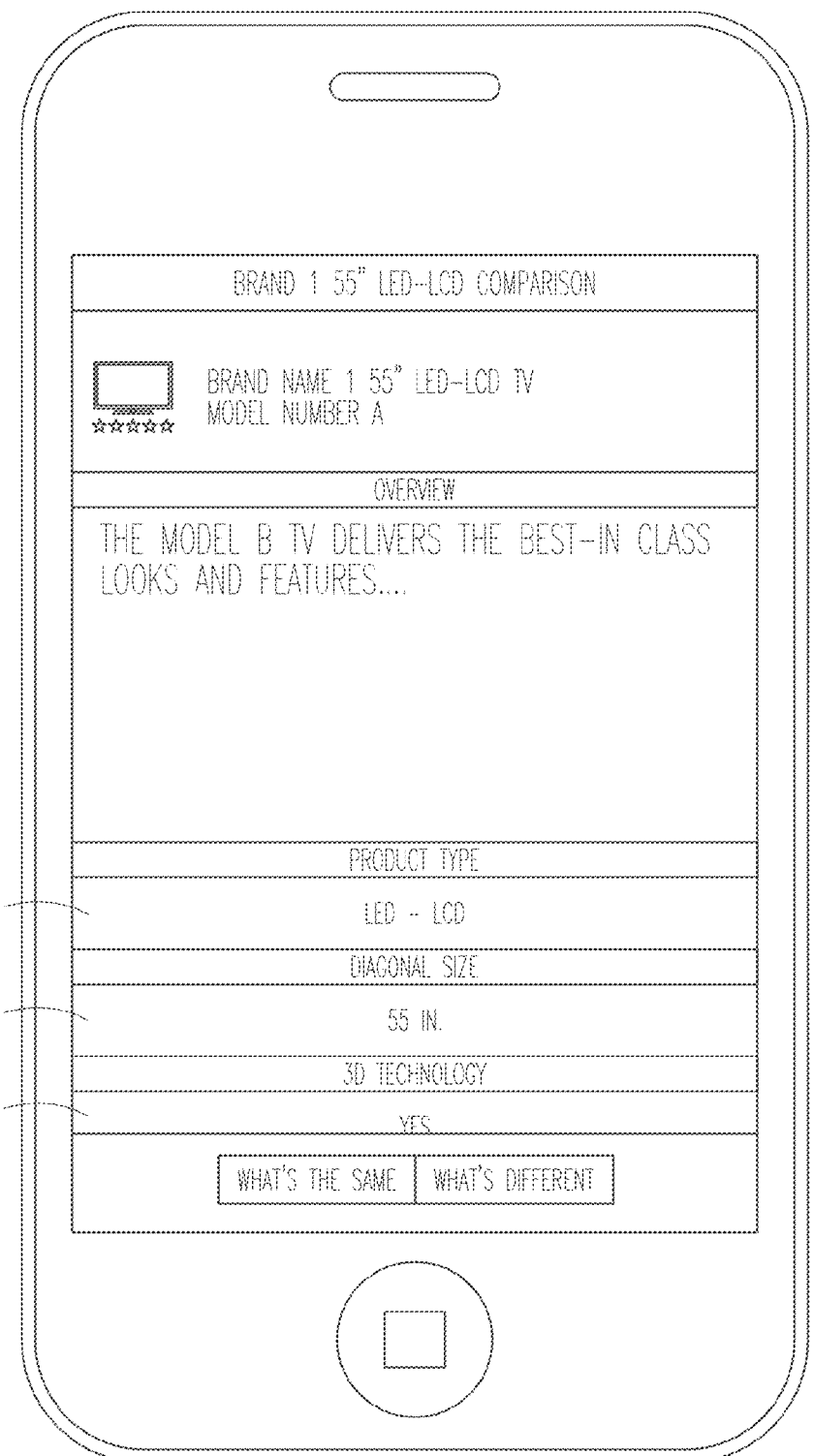
FIG. 24 illustrates an example user interface showing a purchase comparison page, consistent with some embodiments of the invention.

FIG. 24 illustrates an example user interface showing a purchase comparison page, consistent with some embodiments of the invention. Here, the user has "swiped up," revealing more information on product type 2400, diagonal size 2402, and 3-D technology 2404. If the user then swiped right, returning the display to the first product comparison page 2100, the placement of these attributes of that product comparison page would remain consistent. In other words, if the user swiped right, the user would be able to see the diagonal size of the first product on the same row as the diagonal size 2402 of this product.

Figure 25:
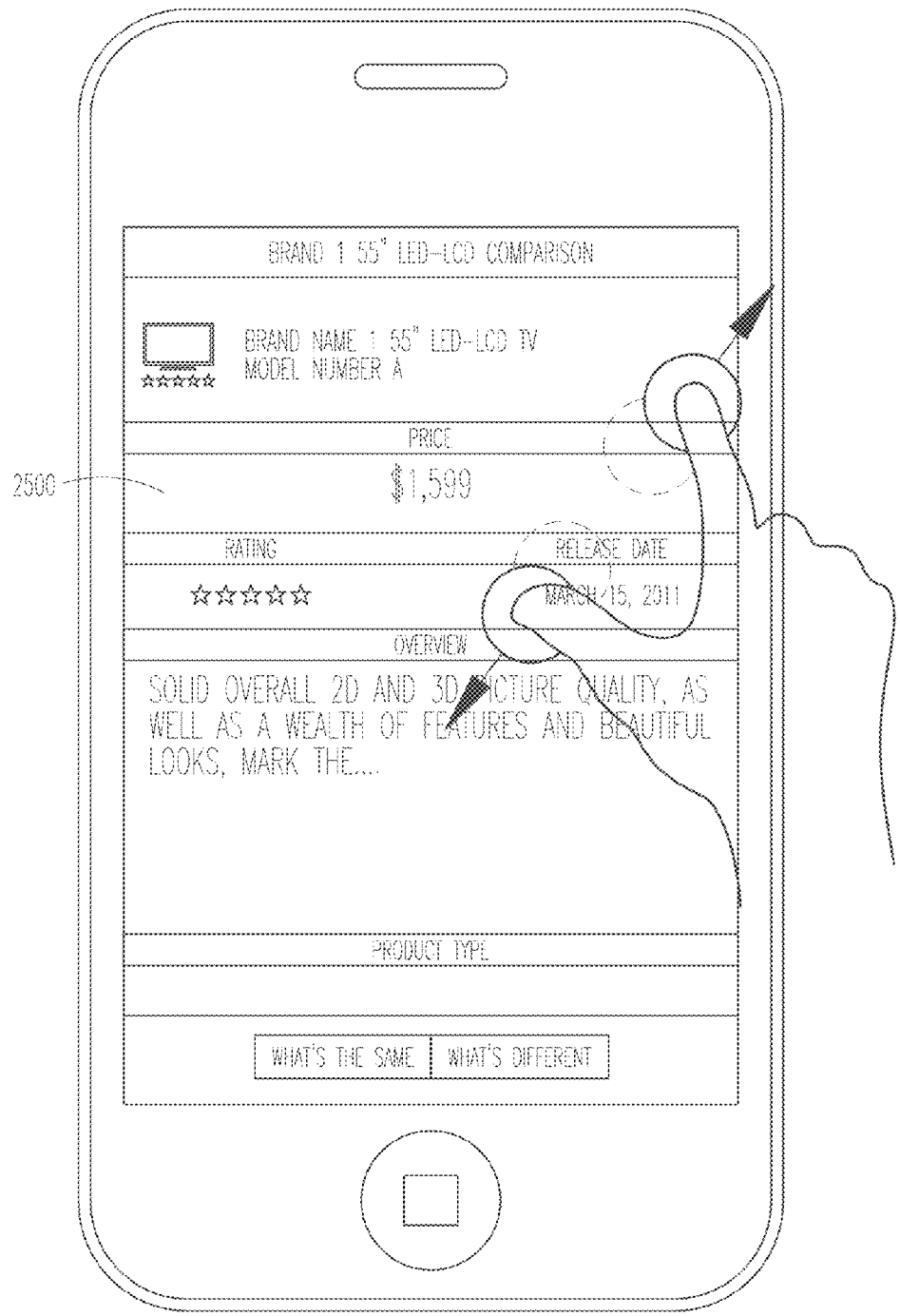
FIG. 25 illustrates an example user interface showing a purchase comparison page, consistent with some embodiments of the invention.
Figure 26:
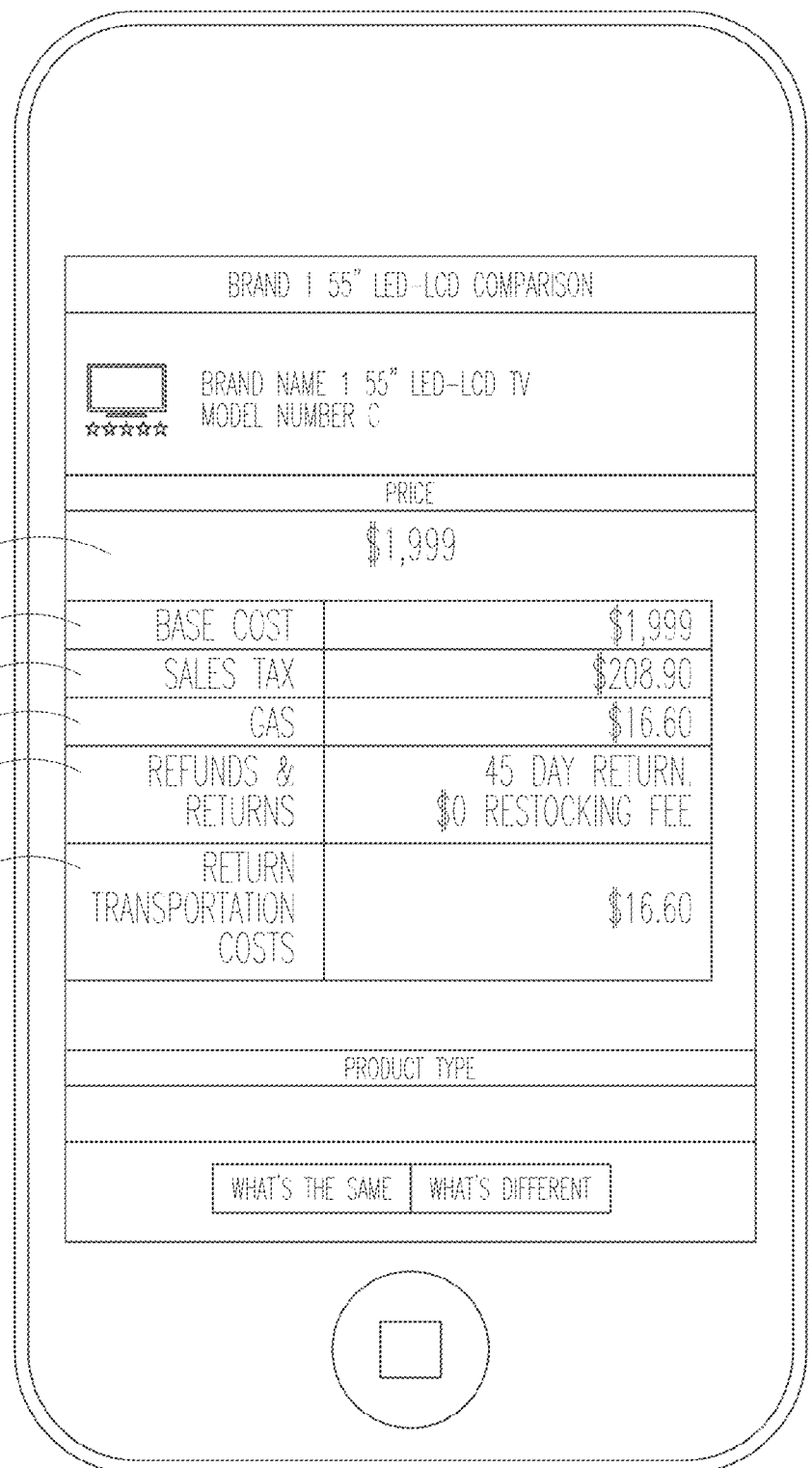
FIG. 26 illustrates an example user interface showing a purchase comparison page, consistent with some embodiments of the invention.

Additional gestures can also provide additional information about each product. The attributes of a product can be at least partially represented in a hierarchical fashion, allowing "drill down" and "roll up commands" to see or hide sub-attributes. FIG. 25 illustrates an example user interface showing a purchase comparison page, consistent with some embodiments of the invention. In this figure, a user may select one of the attributes 2500 by selecting it with a finger or fingers, and then pinch-to-zoom by spreading his or her fingers apart to reveal sub-attributes. FIG. 26 illustrates an example user interface showing a purchase comparison page, consistent with some embodiments of the invention. Here, after the user has elected to drill down using the aforementioned pinch to zoom, sub attributes of the attribute 2500 are presented, here being base price 2600, sales tax 2602, fuel cost 2604, return cost 2606, and return transportation cost 2608. To return to hiding these sub-attributes, the user may "roll up" by performing the reverse gesture (bringing fingers closer together).

Figure 27:
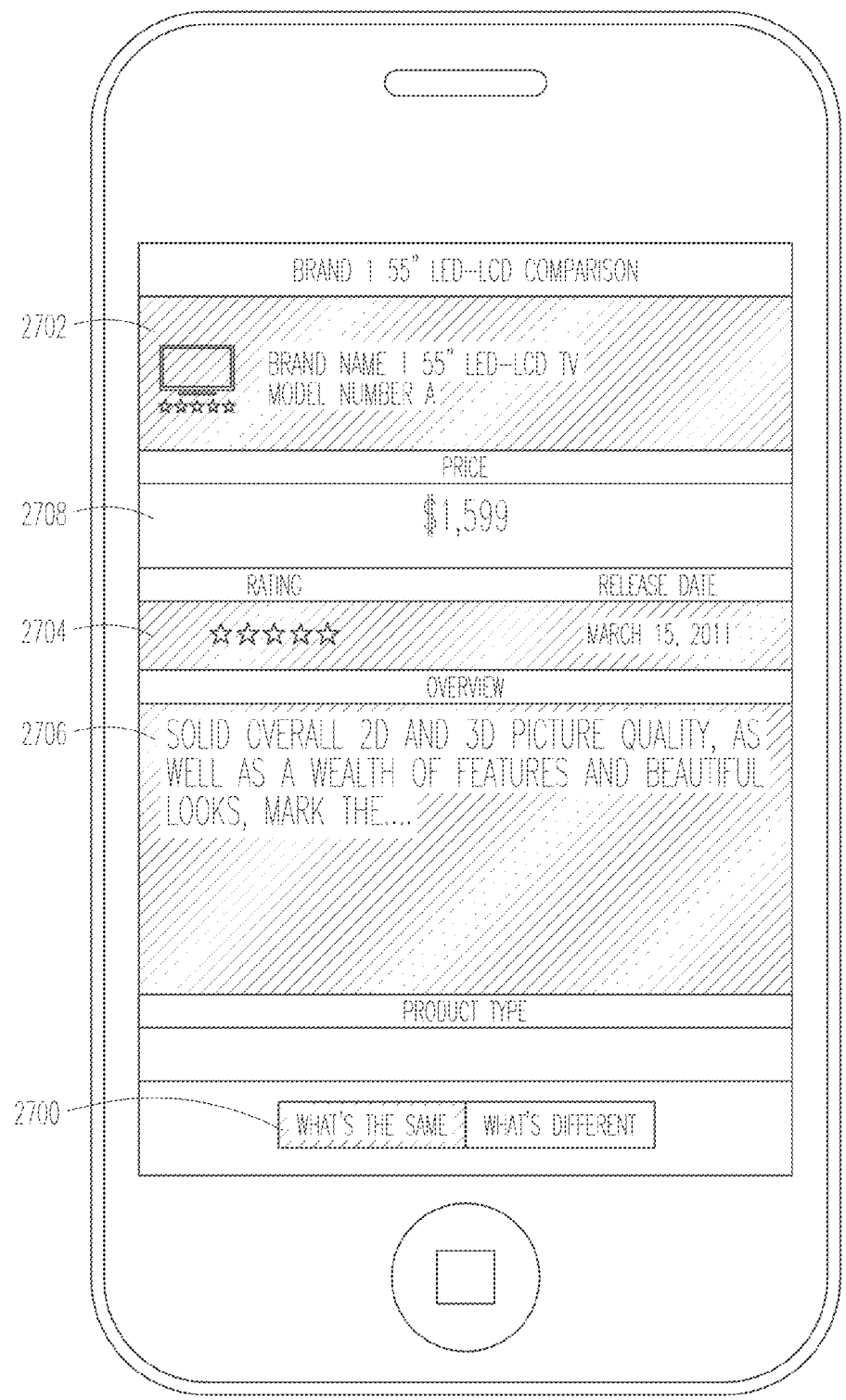
FIG. 27 illustrates an example user interface showing a product comparison page, consistent with some example embodiments.

Also available to the user are buttons that highlight what is the same and what are different between the product pages. FIG. 27 illustrates an example user interface showing a product comparison page, consistent with some example embodiments. Here, the user has selected the "What's the Same" button 2700, which causes the attributes on the page that are in common across all the pinned product comparison pages to be highlighted. Here, the product title 2702 is highlighted, as are the rating and release date 2704, and overview 2706. The price 2708, however, being different between the pinned product comparison pages, is not highlighted.

Figure 28:
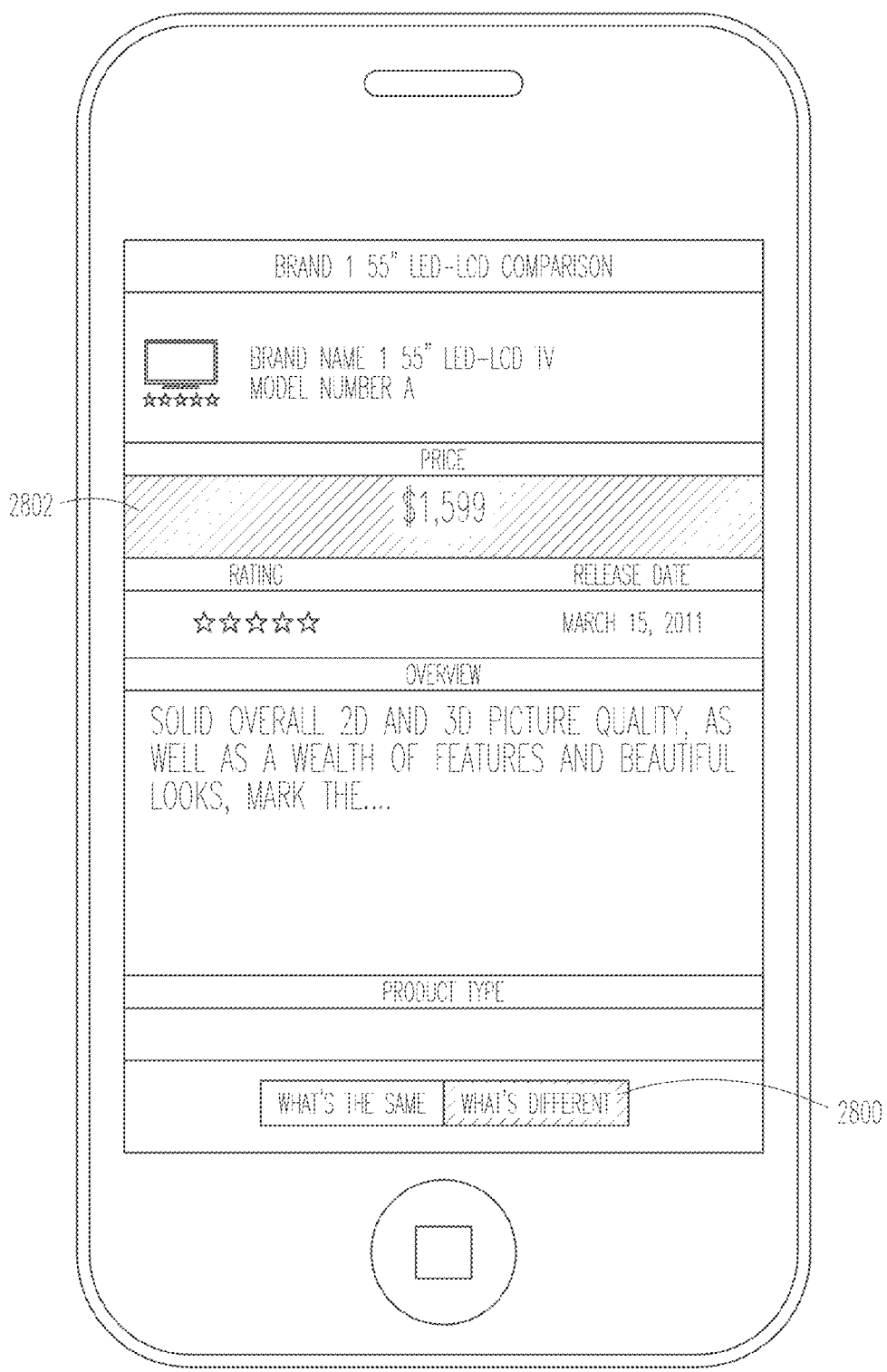
FIG. 28 illustrates an example user interface showing a product comparison page, consistent with some example embodiments.

FIG. 28 illustrates an example user interface showing a product comparison page, consistent with some example embodiments. Here, the user has selected the "What's different" button 2800, which causes the attributes on the page that are different across the pinned product comparison pages to be highlighted. Here, the price 2802 is highlighted.

Figure 29:
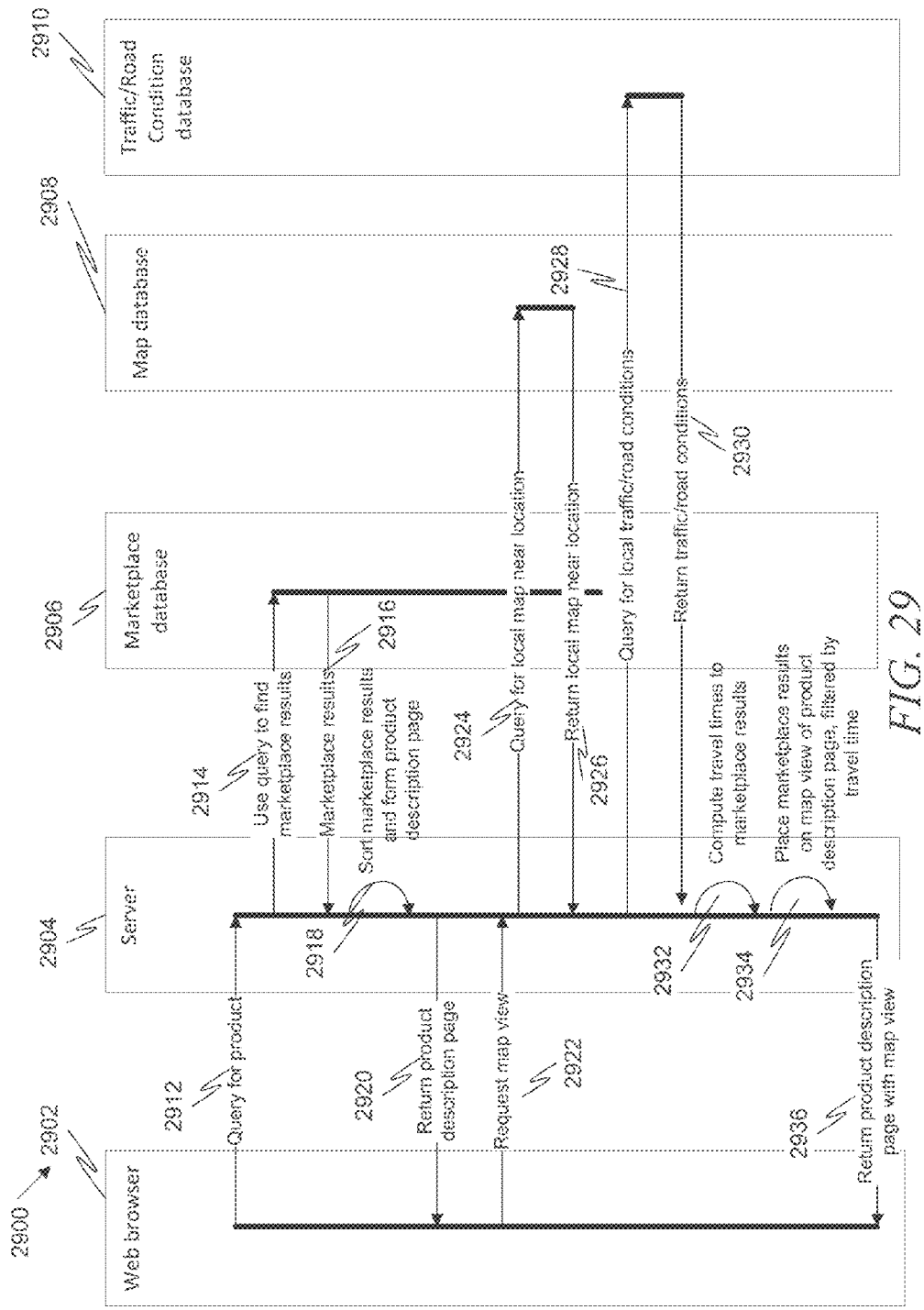
FIG. 29 is an interaction diagram showing a method, in accordance with an example embodiment, of presenting marketplace results.

FIG. 29 is an interaction diagram showing a method, in accordance with an example embodiment, of presenting marketplace results. The method 2900 involves five components: a web browser 2902, a server 2904, a marketplace database 2906, a map database 2908, and a traffic/road condition database 2910, although as will be seen the method 2900 could be performed with more or fewer components. The web browser 2902 may operate on an electronic device such as a laptop or desktop computer. It should be noted that a software application, such as an app running on a mobile device, could be substituted for the web browser 2902. The term "web browser" should be interpreted broadly to cover any application that is capable of displaying web pages, which may include many apps running on mobile devices.

At operation 2912, the web browser 2902 may send a query for a product to the server 2904. This query may include search parameters. Either separately or along with this query, the location of the electronic device on which the web browser 2902 is running may be transmitted to the server 2904. This location may be obtained, for example, from a global positioning system (GPS) module in the electronic device (as is common for mobile devices), or may simply be a location identified by a user profile or IP address lookup (as is common for non-mobile devices).

At operation 2914, the server 2904 uses the query to find marketplace results by accessing the marketplace database 2906. At operation 2916, the marketplace database 2906 sends marketplace results to the server 2904. At operation 2918, the server 2904 sorts the marketplace results and forms a product description page. At operation 2920 the server 2904 returns the product description page to the web browser 2902.

At some point later, at operation 2922, the web browser 2902 may request a map view. At operation 2924, the server 2904 may query a map database 2908 for a local map near the location of the web browser 2902. At operation 2926, the map database 2908 may return the local map to the server 2904. At operation 2928, the server 2904 may query a traffic/road condition database 2910 for traffic and road conditions. The traffic and road conditions may be returned at operation 2930. It should be noted that while the traffic and road conditions are depicted as being stored in a single traffic/road condition database 2910, these items may actually be split into different databases. Additionally, other databases (such as weather databases) may also be queried for factors that may impact the travel time calculation.

At operation 2932, travel times to marketplace results may be calculated. This calculation may be based on route distances calculated from the local map (e.g., finding the shortest route through streets and highways) and based on the traffic and road conditions. In some example embodiments, additional information may be used to determine the travel time. For example, if the user does not own a vehicle, the travel time using public transportation (including time taken to wait for busses, trains, etc.) may be included.

At operation 2934, the marketplace results may be placed on a map view of a product description page, filtered by travel time. The user may filter out certain of the results via, for example, a slider that limits the display to only results within a selected travel time.

At operation 2936, the product description page with map view is returned to the web browser 2902 for display.

Figure 30:
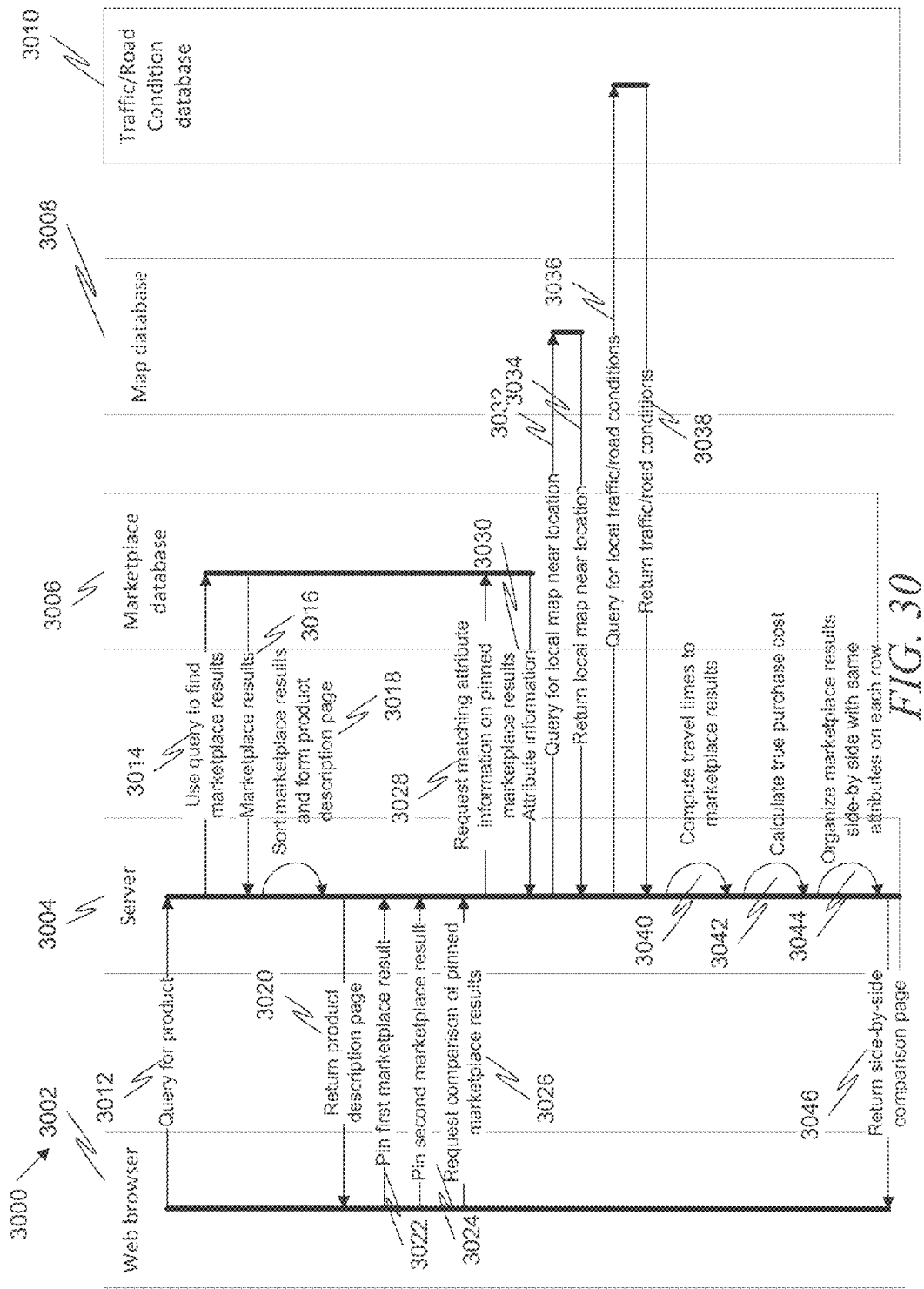
FIG. 30 is an interaction diagram showing a method, in accordance with an example embodiment, of presenting marketplace results.

FIG. 30 is an interaction diagram showing a method, in accordance with an example embodiment, of presenting marketplace results. The method 3000 involves five components: a web browser 3002, a server 3004, a marketplace database 3006, a map database 3008, and a traffic/road condition database 3010, although as will be seen the method 3000 could be performed with more or fewer components.

At operation 3012, the web browser 3002 may send a query for a product to the server 3004. This query may include search parameters. Either separately or along with this query, the location of the electronic device on which the web browser 3002 is running may be transmitted to the server 3004. This location may be obtained, for example, from a global positioning system (GPS) module in the electronic device (as is common for mobile devices), or may simply be a location identified by a user profile or IP address lookup (as is common for non-mobile devices).

At operation 3014, the server 3004 uses the query to find marketplace results by accessing the marketplace database 3006. At operation 3016, the marketplace database 3006 sends marketplace results to the server 3004. At operation 3018, the server 3004 sorts the marketplace results and forms a product description page. At operation 3020 the server 3004 returns the product description page to the web browser 3002.

At some point later, at operation 3022, the web browser 3002 may pin a first marketplace result. At operation 3024, the web browser 3002 may pin a second marketplace result. While only two pinned marketplace results are depicted, it should be noted that any number of marketplace results can be pinned. At operation 3026, the web browser 3002 may request a comparison of pinned marketplace results. This may be caused by, for example, a user selecting a "compare" button.

At operation 3028, the server 3004 may request matching attribute information on the pinned marketplace results. By matching attribute information, what is meant is that the same type of information is sought for each of the pinned marketplace results. For example, price, size, sales tax, return policy, etc. may all be requested for each of the pinned marketplace results. At operation 3030, the matching attribute information is returned to the server 3004. In some embodiments, this information is already available from the original marketplace results presented to the server 3004, and thus this step may not be needed if all the information is already known to the server 3004.

At operation 3032, the server 3004 may query a map database 3008 for a local map near the location of the web browser 3002. At operation 3034, the map database 3008 may return the local map to the server 3004. At operation 3036, the server 3004 may query a traffic/road condition database 3010 for traffic and road conditions. The traffic and road conditions may be returned at operation 3038. It should be noted that while the traffic and road conditions are depicted as being stored in a single traffic/road condition database 3010, these items may actually be split into different databases. Additionally, other databases (such as weather databases) may also be queried for factors that may impact the travel time calculation.

At operation 3040, travel times to marketplace results may be calculated. This calculation may be based on route distances calculated from the local map (e.g., finding the shortest route through streets and highways) and based on the traffic and road conditions. In some example embodiments, additional information may be used to determine the travel time. For example, if the user does not own a vehicle, the travel time using public transportation (including time taken to wait for busses, trains, etc.) may be included.

At operation 3042, a true purchase cost for each of the pinned marketplace results to be compared may be calculated. This may be calculated using any of the available attributes for the pinned marketplace results. As an example, the price of a product, sales tax, and any travel cost or shipping cost may be added. In some instances, the cost of return (e.g., restocking fees and return travel cost or shipping cost) may be added as well. The travel cost may be estimated using the calculated travel times. Current fuel costs may be obtained and used to aid in providing this estimate. In addition, personal information about the user, such as vehicle information, can be used a well. A user driving a high miles-per-gallon (MPG) vehicle, for example, will have a lower travel cost to a destination than the same driving having a low MPG vehicle.

At operation 3044, the marketplace results may be organized side-by-side on a single web page, with the same attributes on each row. At operation 3046, the side-by-side comparison page may be returned to the web browser 3002.

Figure 31:
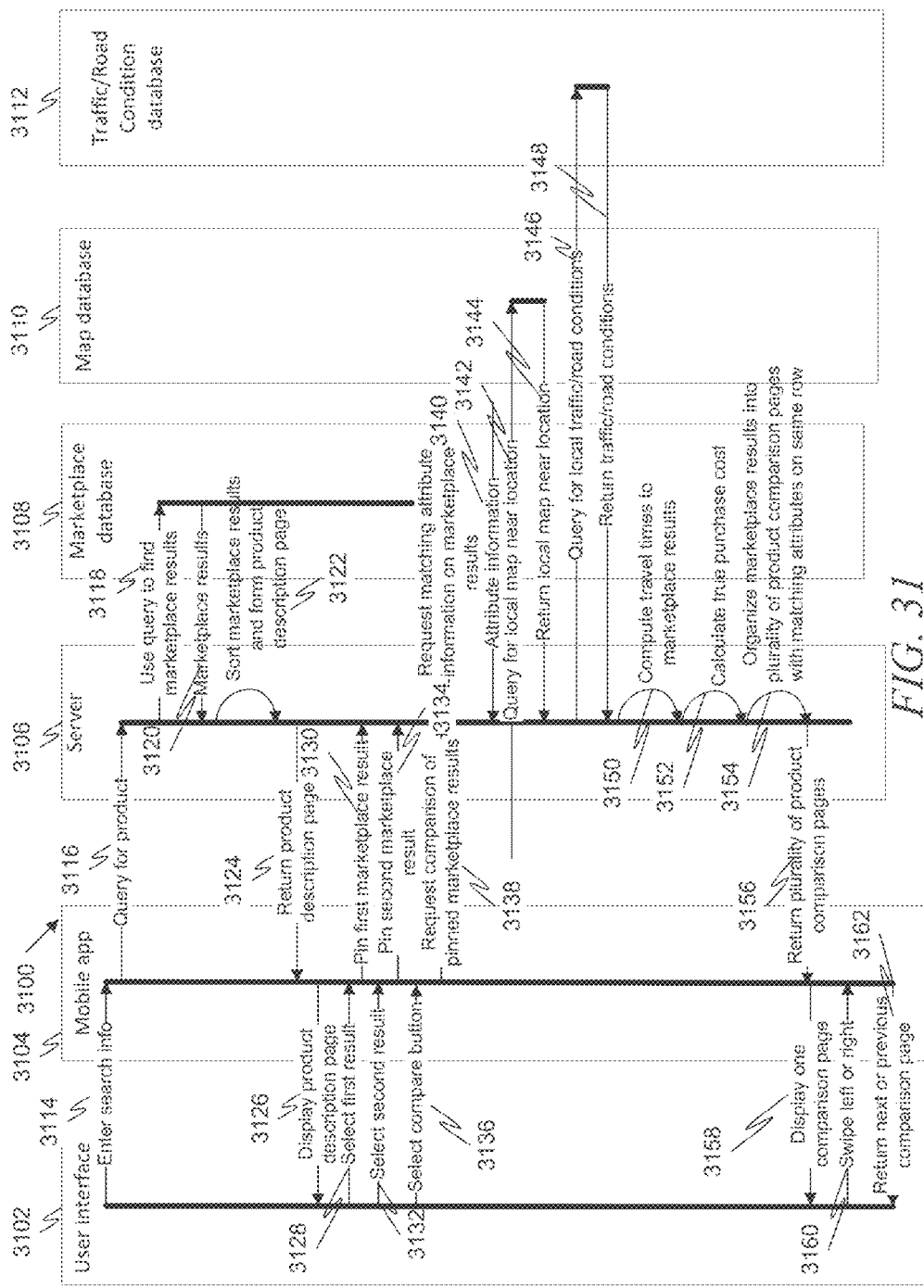
FIG. 31 is an interaction diagram showing a method, in accordance with an example embodiment, of presenting marketplace results.

FIG. 31 is an interaction diagram showing a method, in accordance with an example embodiment, of presenting marketplace results. The method 3100 involves six components: a user interface 3102, a mobile app 3104, a server 3106, a marketplace database 3108, a map database 3110, and a traffic/road condition database 3112, although as will be seen the method 3100 could be performed with more or fewer components. The user interface 3102 and mobile app 3104 may be located on the same electronic device. In one example embodiment, this electronic device is a mobile device.

At operation 3114, a user may enter search information into a user interface 3102, which may pass this search information to the mobile app 3104. At operation 3116, the mobile app 3104 may send a query for a product to the server 3106. This query may include search parameters. Either separately or along with this query, the location of the electronic device on which the mobile app 3104 is running may be transmitted to the server 3106. This location may be obtained, for example, from a global positioning system (GPS) module in the electronic device (as is common for mobile devices), or may simply be a location identified by a user profile or IP address lookup (as is common for non-mobile devices).

At operation 3118, the server 3106 uses the query to find marketplace results by accessing the marketplace database 3108. At operation 3120, the marketplace database 3108 sends marketplace results to the server 3106. At operation 3122, the server 3106 sorts the marketplace results and forms a product description page. At operation 3124 the server 3106 returns the product description page to the mobile app 3104, which then causes the display of the product description page on the user interface 3102 at operation 3126.

At some point later, at operation 3128, the user may pin a first marketplace result. This causes the mobile app 3104 to indicate the pinned result to the server 3106 at operation 3130. At operation 3132, the user may pin a second marketplace result. This causes the mobile app 3104 to indicate the pinned result to the server 3106 at operation 3134. While only two pinned marketplace results are depicted, it should be noted that any number of marketplace results can be pinned. It should also be noted that the pinned results could alternatively be transmitted to server 3106 all at once as opposed to one at a time as the user pins them, although sending them one at a time allows for easier recovery should the electronic device suffer a crash or other power outage that causes the information about pinned items to be lost.

At operation 3136, the user may request a comparison of pinned marketplace results. This may be caused by, for example, a user selecting a "compare" button. At operation 3138, this information may be passed to the server 3106.

At operation 3140, the server 3106 may request matching attribute information on the pinned marketplace results. By matching attribute information, what is meant is that the same type of information is sought for each of the pinned marketplace results. For example, price, size, sales tax, return policy, etc. may all be requested for each of the pinned marketplace results. At operation 3142, the matching attribute information is returned to server 3106. In some embodiments, this information is already available from the original marketplace results presented to the server 3106, and thus this step may not be needed if all the information is already known to the server 3106.

At operation 3144, the server 3106 may query a map database 3110 for a local map near the location of the electronic device. At operation 3146, the map database 3110 may return the local map to the server 3106. At operation 3148, the server 3106 may query a traffic/road condition database 3112 for traffic and road conditions. The traffic and road conditions may be returned to the server 3106 at operation 3150. It should be noted that while the traffic and road conditions are depicted as being stored in a single traffic/road condition database 3112, these items may actually be split into different databases. Additionally, other databases (such as weather databases) may also be queried for factors that may impact the travel time calculation.

At operation 3152, travel times to marketplace results may be calculated. This calculation may be based on route distances calculated from the local map (e.g., finding the shortest route through streets and highways) and based on the traffic and road conditions. In some example embodiments, additional information may be used to determine the travel time. For example, if the user does not own a vehicle, the travel time using public transportation (including time taken to wait for busses, trains, etc.) may be included.

At operation 3154, a true purchase cost for each of the pinned marketplace results to be compared may be calculated. This may be calculated using any of the available attributes for the pinned marketplace results. As an example, the price of a product, sales tax, and any travel cost or shipping cost may be added. In some instances, the cost of return (e.g., restocking fees and return travel cost or shipping cost) may be added as well. The travel cost may be estimated using the calculated travel times. Current fuel costs may be obtained and used to aid in providing this estimate. In addition, personal information about the user, such as vehicle information, can be used a well. A user driving a high miles-per-gallon (MPG) vehicle, for example, will have a lower travel cost to a destination than the same driving having a low MPG vehicle.

At operation 3156, the marketplace results may be organized side-by-side on a plurality of product comparison pages, with the same attributes on each row. At operation 3158, the plurality of product comparison pages can be returned to the mobile app 3104. At operation 3160, one of the product comparison pages can be displayed on the user interface 3102. At operation 3162 the user may swipe left or right. At operation 3164, the mobile app 3104 may return the next or previous product comparison page based upon whether the user swipes left or right, respectively.

Figure 32:
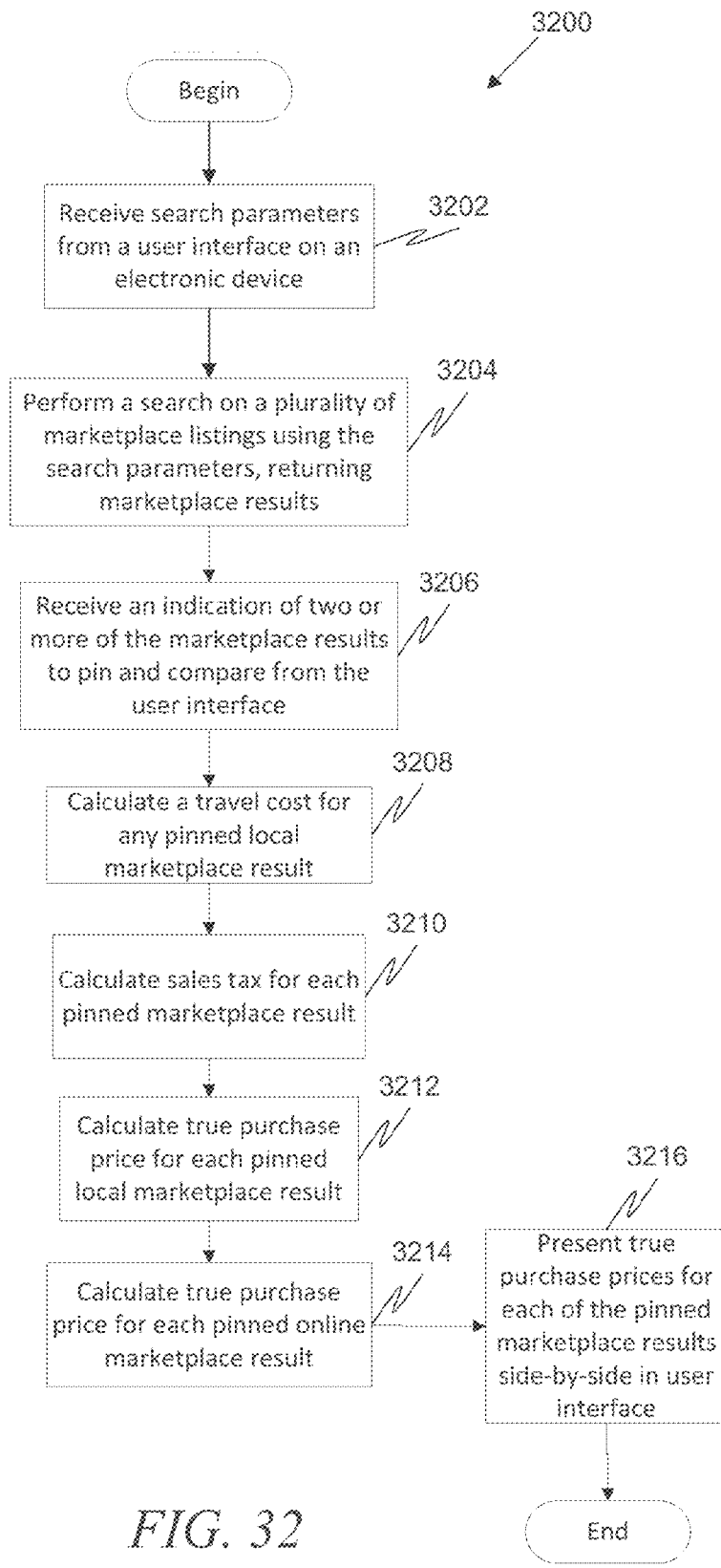
FIG. 32 is a flow diagram illustrating a method, in accordance with an example embodiment, of presenting marketplace listings.

FIG. 32 is a flow diagram illustrating a method 3200, in accordance with an example embodiment, of presenting marketplace listings. At operation 3202, search parameters are received from a user interface on an electronic device. At operation 3204, a search is performed on a plurality of marketplace listings using the search parameters, returning marketplace results. At operation 3206, an indication is received from the user interface of two or more of the marketplace results to pin and compare. At operation 3208, a travel cost for any pinned local marketplace result to compare is calculated by determining a travel distance between the electronic device and the location in the pinned local marketplace result to compare, and estimating a cost associated with traveling the travel distance. This travel cost may be based on various factors, such as, for example, a travel distance, fuel cost, vehicle type, public transportation cost, toll cost, etc. At operation 3210, sales tax, if any, is calculated for each pinned marketplace results to compare. At operation 3212, a true purchase price for each pinned local marketplace result may be calculated by adding the price for the product, the sales tax, and the travel cost. At operation 3214, a true purchase price for each pinned online marketplace result to compare is calculated by adding the price for the product, the sales tax, and the shipping cost. At operation 3216, the true purchase price for each of the pinned marketplace results is presented to compare by displaying the true purchase price for each of the pinned marketplace results to compare side-by-side in the user interface. It should be noted that the presenting shall be interpreted broadly to include the act of passing one or more web pages from a server to an electronic device to be displayed—there is no necessity that the device performing the steps of the method 3200 actually have a display itself.

Figure 33:
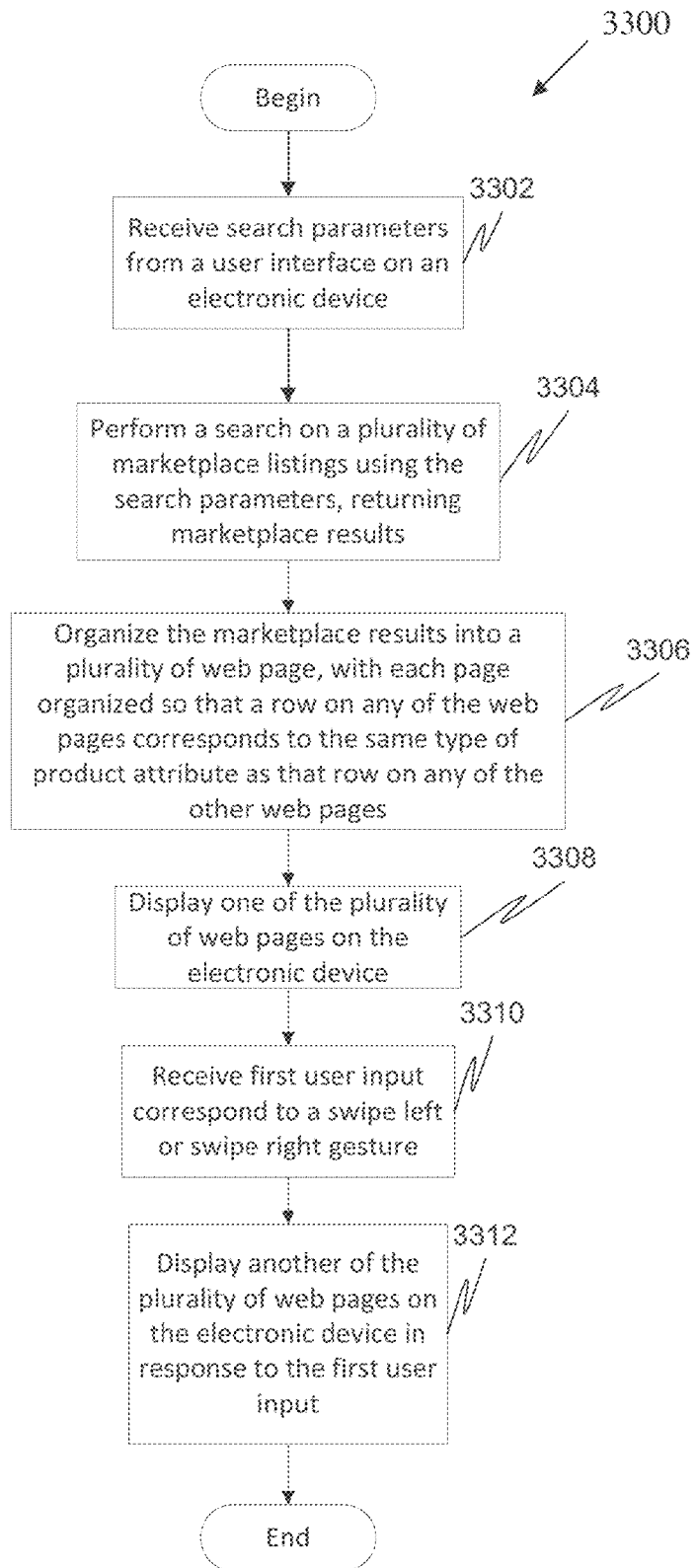
FIG. 33 is a flow diagram illustrating a method, in accordance with another example embodiment, of presenting marketplace listings.

FIG. 33 is a flow diagram illustrating a method 3300, in accordance with another example embodiment, of presenting marketplace listings. At operation 3302, search parameters are received from a user interface on an electronic device. At operation 3304, a search is performed on a plurality of marketplace listings using the search parameters, returning marketplace results. The marketplace results may each include a plurality of product attributes. At operation 3306, the marketplace results are organized into a plurality of web pages, with each web page organized so that a row on any one of the web pages corresponds to the same type of product attribute as that row on any of the other of the plurality of web pages. At operation 3308, one of the plurality of web pages is displayed on the electronic device. At operation 3310, a first user input corresponding to a swipe left or a swipe right gesture is received. At operation 3312, the display of another of the plurality of web pages on the electronic device is caused in response to the first user input.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 34:
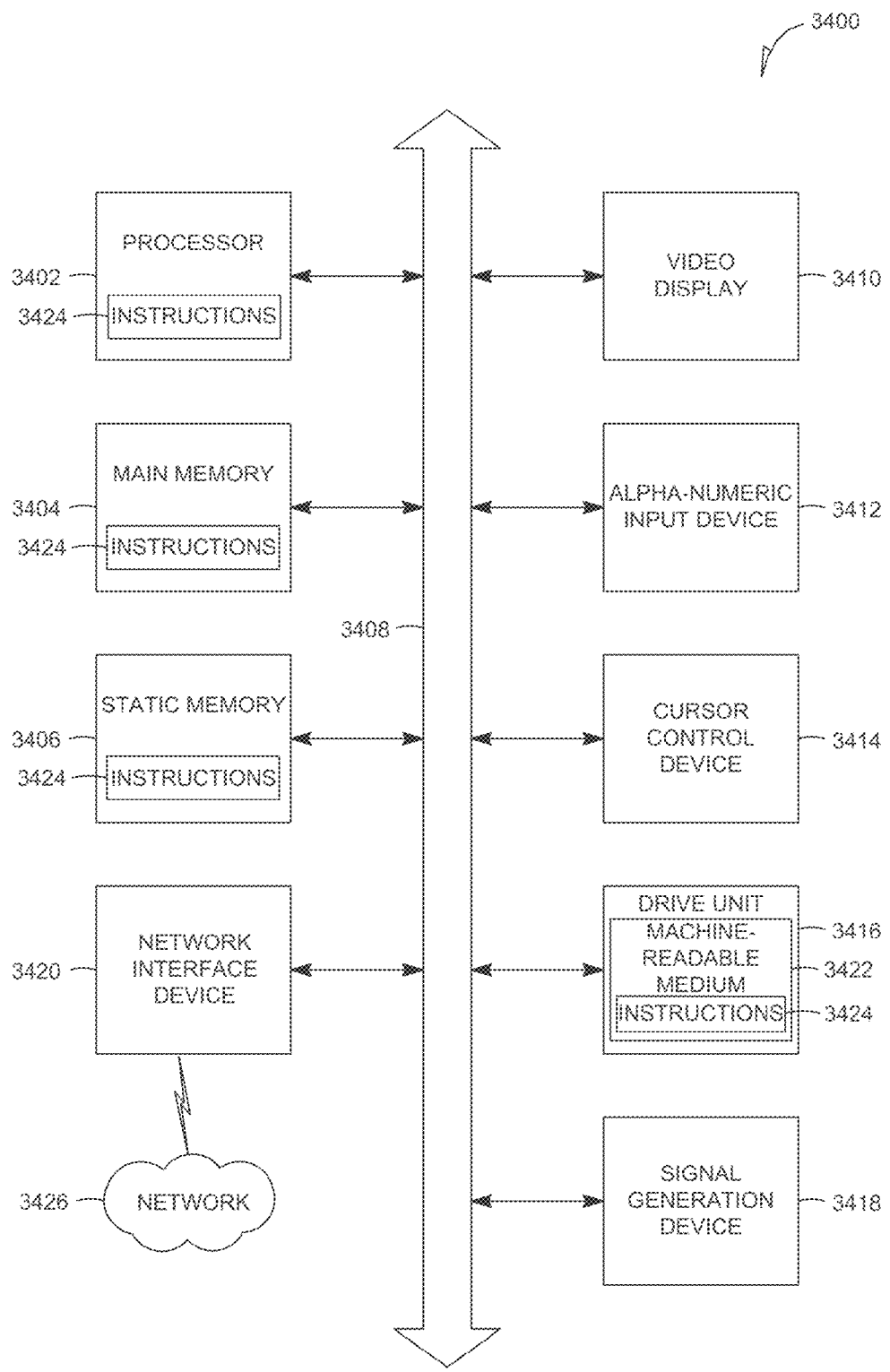
FIG. 34 is a block diagram of a machine in the form of a computer system within which a set of instructions for causing the machine to perform any one or more of the methodologies discussed herein may be executed.

FIG. 34 is a block diagram of a machine in the form of a computer system within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In one embodiment, the machine will be a server computer; however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 3400 includes a processor 3402 (e.g., a central processing unit (CPU), a graphics processing unit (GPU) or both), a main memory 3404 and a static memory 3406, which communicate with each other via a bus 3408. The computer system 3400 may further include a display unit 3410, an alphanumeric input device 3412 (e.g., a keyboard), and a user interface (UI) navigation (cursor control) device 3414 (e.g., a mouse). In one embodiment, the display 3410, input device 3412 and cursor control device 3414 are a touch screen display. The computer system 3400 may additionally include a drive unit 3416 (e.g., drive unit), a signal generation device 3418 (e.g., a speaker), a network interface device 3420, and one or more sensors (not pictured), such as a global positioning system sensor, compass, accelerometer, or other sensor.

The drive unit 3416 includes a machine-readable medium 3422 on which is stored one or more sets of data structures and instructions 3424 (e.g., software) embodying or utilized by any one or more of the methodologies or functions described herein. The instructions 3424 may also reside, completely or at least partially, within the main memory 3404 and/or within the processor 3402 during execution thereof by the computer system 3400, the main memory 3404 and the processor 3402 also constituting machine-readable media.

While the machine-readable medium 3422 is illustrated in an example embodiment to be a single medium, the term "machine-readable medium" may include a single medium or multiple media (e.g., a centralized or distributed database, and/or associated caches and servers) that store the one or more instructions 3424. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The instructions 3424 may further be transmitted or received over a communications network 3426 using a transmission medium via the network interface device 3420 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although the inventive subject matter has been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A method of providing a user interface, the method comprising:
    receiving search parameters from the touchscreen user interface on a mobile electronic device;
    performing a search on a plurality of marketplace listings using the search parameters and returning local marketplace results, the local marketplace results each including a retailer identification, location, and a price for a product;
    creating a first page containing the local marketplace results and for display in the touchscreen user interface, the first page including an interactive button next to each local marketplace result;
    receiving an indication, via a plurality of the interactive buttons, from the touchscreen user interface of two or more of the local marketplace results to pin and compare, the indication including a selection of the two or more of the local marketplace results to pin and compare from the local marketplace results, the pinning including marking the two or more of the local marketplace results for future comparison with one another;
    calculating a travel cost for any pinned local marketplace result to compare by determining a travel distance between the mobile electronic device and the location in the pinned local marketplace result to compare and estimating a cost associated with traveling the travel distance;
    determining sales tax for each pinned local marketplace result to compare;
    calculating a true purchase price for each pinned local marketplace result to compare by adding the price for the product, the sales tax, and the travel cost;
    determining, for each attribute of a plurality of attributes for the pinned local marketplace results, whether a value for an attribute for a first of the pinned local marketplace results differs from a value for the same type of attribute for a second of the pinned local marketplace results, the plurality of attributes including the true purchase price and at least one other category of specifications about the pinned local marketplace results;
    creating a second page depicting attributes, including true purchase price, of the first of the pinned local marketplace results, the second page containing a visual indication that the value of an attribute of the first of the pinned local marketplace results differs from a value for the same type of attribute of the second of the pinned local marketplace results;
    creating a third page depicting attributes, including true purchase price, of the second of the pinned local marketplace results, the third page containing a visual indication that the value of an attribute of the second of the pinned local marketplace results differs from a value for the same type of attribute of the first of the pinned local marketplace results;
    the creating of the second and third pages performed such that every attribute of a pinned local marketplace result displayed on the second and third pages is displayed on a row in the second page that is the same as a row on the third page, so that each attribute on the second page lines up horizontally with the same type of attribute on the third page;
    causing the second page to be displayed in the touchscreen user interface; and
    in response to a swipe-left gesture detected by the touchscreen user interface, causing the second page to be scrolled out of the touchscreen user interface by gradually moving the second page to the left and removing any portion of the second page that falls outside the boundaries of the touchscreen user interface due to the moving while simultaneously causing the third page to be scrolled into the touchscreen user interface by gradually moving the third page leftwards into the touchscreen user interface until it is completely displayed in the touchscreen user interface.

2. The method of claim 1, wherein the cost associated with traveling the travel distance includes fuel cost.

3. The method of claim 2, wherein the fuel cost takes into account a type of vehicle operated by a user of the mobile electronic device.

4. The method of claim 1, wherein the cost associated with traveling the travel distance includes toll fees.

5. The method of claim 1, wherein the cost associated with traveling the travel distance includes public transportation costs.

6. The method of claim 1, wherein the performing the search includes passing the search parameters to a server which conducts a query on a marketplace database using the search parameters.

7. The method of claim 1, further comprising;
    calculating a total cost to return for each of the pinned marketplace results to compare; and
    adding the total cost to return to each of the true purchase prices for the pinned marketplace results to compare.

8. The method of claim 7, wherein the calculating the total cost to return includes, for at least one of the pinned local marketplace results to compare, adding any restocking fee to the travel cost.

9. The method of claim 7, wherein the calculating the total cost to return includes, for at least one of the pinned local marketplace results to compare, adding any restocking fee to a cost to ship a return parcel.

10. The method of claim 1, further comprising:
    upon receiving a pinch to zoom command from the touchscreen user interface, breaking down the true purchase price into individual constituent costs and displaying the individual constituent costs for each of the pinned marketplace results to compare horizontally side-by-side.

11. A system comprising:

a marketplace database comprising a hardware memory containing a plurality of marketplace listings;

a web server comprising one or more processors and configured to:

receive search parameters from the touchscreen user interface on a mobile electronic device;

perform a search on a plurality of marketplace listings using the search parameters and returning local marketplace results, the local marketplace results each including a retailer identification, location, and a price for a product;

create a first page containing the local marketplace results and for display in the touchscreen user interface, the first page including an interactive button next to each local marketplace result;

receive an indication, via a plurality of the interactive buttons, from the touchscreen user interface of two or more of the local marketplace results to pin and compare, the indication including a selection of the two or more of the local marketplace results to pin and compare from the local marketplace results, the pinning including marking the two or more of the local marketplace results for future comparison with one another;

calculate a travel cost for any pinned local marketplace result to compare by determining a travel distance between the mobile electronic device and the location in the pinned local marketplace result to compare and estimating a cost associated with traveling the travel distance;

determine sales tax for each pinned local marketplace result to compare;

calculate a true purchase price for each pinned local marketplace result to compare by adding the price for the product, the sales tax, and the travel cost;

determine, for each attribute of a plurality of attributes for the pinned local marketplace results, whether a value for an attribute for a first of the pinned local marketplace results differs from a value for the same type of attribute for a second of the pinned local marketplace results, the plurality of attributes including the true purchase price and at least one other category of specifications about the pinned local marketplace results;

create a second page depicting attributes, including true purchase price, of the first of the pinned local marketplace results, the second page containing a visual indication that the value of an attribute of the first of the pinned local marketplace results differs from a value for the same type of attribute of the second of the pinned local marketplace results;

create a third page depicting attributes, including true purchase price, of the second of the pinned local marketplace results, the third page containing a visual indication that the value of an attribute of the second of the pinned local marketplace results differs from a value for the same type of attribute of the first of the pinned local marketplace results;

the creating of the second and third pages performed such that every attribute of a pinned local marketplace result displayed on the second and third pages is displayed on a row in the second page that is the same as a row on the third page, so that each attribute on the second page lines up horizontally with the same type of attribute on the third page;

causing the second page to be displayed in the touchscreen user interface; and in response to a swipe-left gesture detected by the touchscreen user interface, causing the second page to be scrolled out of the touchscreen user interface by gradually moving the second page to the left and removing any portion of the second page that falls outside the boundaries of the touchscreen user interface due to the moving while simultaneously causing the third page to be scrolled into the touchscreen user interface by gradually moving the third page leftwards into the touchscreen user interface until it is completely displayed in the touchscreen user interface.

12. The system of claim 11, further comprising a map database and wherein the calculating the travel cost includes accessing the map database to determine a quickest route between the electronic device and the location in the pinned local marketplace result.

13. The system of claim 12, further comprising a traffic database and wherein the calculating the travel cost includes utilizing the traffic database in estimating the cost associated with traveling the travel distance.

14. A non-transitory computer-readable storage medium comprising instructions that, when executed by at least one processor of a machine, cause the machine to perform operations of presenting marketplace listings, the operations comprising:

receiving search parameters from the touchscreen user interface on a mobile electronic device;

performing a search on a plurality of marketplace listings using the search parameters and returning local marketplace results, the local marketplace results each including a retailer identification, location, and a price for a product;

creating a first page containing the local marketplace results and for display in the touchscreen user interface, the first page including an interactive button next to each local marketplace result;

receiving an indication, via a plurality of the interactive buttons, from the touchscreen user interface of two or more of the local marketplace results to pin and compare, the indication including a selection of the two or more of the local marketplace results to pin and compare from the local marketplace results, the pinning including marking the two or more of the local marketplace results for future comparison with one another;

calculating a travel cost for any pinned local marketplace result to compare by determining a travel distance between the mobile electronic device and the location in the pinned local marketplace result to compare and estimating a cost associated with traveling the travel distance;

determining sales tax for each pinned local marketplace result to compare;

calculating a true purchase price for each pinned local marketplace result to compare by adding the price for the product, the sales tax, and the travel cost;

determining, for each attribute of a plurality of attributes for the pinned local marketplace results, whether a value for an attribute for a first of the pinned local marketplace results differs from a value for the same type of attribute for a second of the pinned local marketplace results, the plurality of attributes including the true purchase price and at least one other category of specifications about the pinned local marketplace results;

creating a second page depicting attributes, including true purchase price, of the first of the pinned local marketplace results, the second page containing a visual indication that the value of an attribute of the first of the pinned local marketplace results differs from a value for the same type of attribute of the second of the pinned local marketplace results;

creating a third page depicting attributes, including true purchase price, of the second of the pinned local marketplace results, the third page containing a visual indication that the value of an attribute of the second of the pinned local marketplace results differs from a value for the same type of attribute of the first of the pinned local marketplace results;

the creating of the second and third pages performed such that every attribute of a pinned local marketplace result displayed on the second and third pages is displayed on a row in the second page that is the same as a row on the third page, so that each attribute on the second page lines up horizontally with the same type of attribute on the third page;

causing the second page to be displayed in the touchscreen user interface; and in response to a swipe-left gesture detected by the touchscreen user interface, causing the second page to be scrolled out of the touchscreen user interface by gradually moving the second page to the left and removing any portion of the second page that falls outside the boundaries of the touchscreen user interface due to the moving while simultaneously causing the third page to be scrolled into the touchscreen user interface by gradually moving the third page leftwards into the touchscreen user interface until it is completely displayed in the touchscreen user interface.

* * * * *